(12) United States Patent
Honea et al.

(10) Patent No.: US 8,526,110 B1
(45) Date of Patent: Sep. 3, 2013

(54) SPECTRAL-BEAM COMBINING FOR HIGH-POWER FIBER-RING-LASER SYSTEMS

(75) Inventors: Eric C. Honea, Seattle, WA (US); Thomas H. Loftus, Seattle, WA (US); Charles A. Lemaire, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1192 days.

(21) Appl. No.: 12/291,031

(22) Filed: Feb. 17, 2009

(51) Int. Cl.
*G02B 27/64* (2006.01)

(52) U.S. Cl.
USPC .......................................................... 359/556

(58) Field of Classification Search
USPC ................... 359/556, 327, 341.3, 341.4, 349, 359/554, 555
See application file for complete search history.

(56) References Cited

U.S. PATENT DOCUMENTS

| | | |
|---|---|---|
| 3,728,117 A | 4/1973 | Heidenhain et al. |
| 4,313,648 A | 2/1982 | Yano et al. |
| 4,367,040 A | 1/1983 | Goto |
| 4,424,435 A | 1/1984 | Barnes, Jr. |
| 4,728,168 A | 3/1988 | Alferness et al. |
| 4,778,237 A | 10/1988 | Sorin et al. |
| 4,794,345 A | 12/1988 | Linford et al. |
| 4,862,257 A | 8/1989 | Ulich |
| 4,895,790 A | 1/1990 | Swanson et al. |
| 5,052,780 A | 10/1991 | Klein |
| 5,319,668 A | 6/1994 | Luecke |
| 5,379,310 A | 1/1995 | Papen et al. |
| 5,440,416 A | 8/1995 | Cohen et al. |
| 5,526,155 A | 6/1996 | Knox et al. |
| 5,608,826 A | 3/1997 | Boord et al. |
| 5,642,447 A | 6/1997 | Pan et al. |

(Continued)

FOREIGN PATENT DOCUMENTS

| | | |
|---|---|---|
| WO | WO 0049436 | 8/2000 |
| WO | WO 0060388 | 10/2000 |

OTHER PUBLICATIONS

Bochove, Eric J., "Theory of Spectral Beam Combining", "IEEE Journal of Quantum Electronics", 2002, pp. 432-445, vol. 38, No. 5.

(Continued)

*Primary Examiner* — Euncha Cherry
(74) *Attorney, Agent, or Firm* — Charles A. Lemaire; Jonathan M. Rixen; Lemaire Patent Law Firm, P.L.L.C.

(57) ABSTRACT

A ring-laser system that includes a plurality of ring-laser gain elements and a spectral-beam-combining output stage configured to combine a plurality of beams coming from the gain elements into an output beam and that includes chromatic-dispersion compensation. In some embodiments, the output stage includes a plurality of highly reflective dielectric-coated focussing elements. In some embodiments, the output stage includes a plurality of high-efficiency dielectric-coated grating elements. In some embodiments, the output stage includes a mostly reflective but partially transmissive output mirror and a highly reflective beam-reversing mirror configured to reflect a majority of a backward-traveling signal beam such that it becomes forward traveling. In some embodiments, each gain element further includes a photonic-crystal-rod power amplifier. Some embodiments have an amplitude modulator configured to pulse the plurality of beams, and a timing controller configured to synchronize the pulses of the plurality of beams. Some embodiments further include a non-linear wavelength-conversion device.

20 Claims, 17 Drawing Sheets

(56) References Cited

U.S. PATENT DOCUMENTS

| | | |
|---|---|---|
| 5,661,835 A | 8/1997 | Kato et al. |
| 5,802,236 A | 9/1998 | DiGiovanni et al. |
| 5,818,630 A | 10/1998 | Fermann et al. |
| 5,847,863 A | 12/1998 | Galvanauskas et al. |
| 5,867,305 A | 2/1999 | Waarts et al. |
| 5,907,436 A | 5/1999 | Perry et al. |
| 5,930,030 A | 7/1999 | Scifres |
| 5,974,060 A | 10/1999 | Byren et al. |
| 6,014,249 A | 1/2000 | Fermann et al. |
| 6,023,361 A | 2/2000 | Ford |
| 6,028,879 A | 2/2000 | Ershov |
| 6,031,952 A | 2/2000 | Lee |
| 6,053,640 A | 4/2000 | Miyokawa et al. |
| 6,061,170 A | 5/2000 | Rice et al. |
| 6,072,931 A | 6/2000 | Yoon et al. |
| 6,081,635 A | 6/2000 | Hehmann |
| 6,097,863 A | 8/2000 | Chowdhury |
| 6,192,062 B1 | 2/2001 | Sanchez-Rubio et al. |
| 6,208,679 B1 | 3/2001 | Sanchez-Rubio et al. |
| 6,212,310 B1 | 4/2001 | Waarts et al. |
| 6,226,077 B1 | 5/2001 | Dunne |
| 6,275,623 B1 | 8/2001 | Brophy et al. |
| 6,288,835 B1 | 9/2001 | Nilsson et al. |
| 6,324,016 B1 | 11/2001 | Luster |
| 6,327,292 B1 | 12/2001 | Sanchez-Rubio et al. |
| 6,330,388 B1 | 12/2001 | Bendett et al. |
| 6,330,523 B1 | 12/2001 | Kacyra et al. |
| 6,339,662 B1 | 1/2002 | Koteles et al. |
| 6,381,008 B1 | 4/2002 | Branagh et al. |
| 6,381,388 B1 | 4/2002 | Epworth et al. |
| 6,396,975 B1 | 5/2002 | Wood et al. |
| 6,418,152 B1 | 7/2002 | Davis |
| 6,456,756 B1 | 9/2002 | Mead |
| 6,493,476 B2 | 12/2002 | Bendett |
| 6,496,301 B1 | 12/2002 | Koplow et al. |
| 6,501,782 B1 | 12/2002 | Farmer |
| 6,603,912 B2 | 8/2003 | Birks |
| 6,625,364 B2 | 9/2003 | Johnson et al. |
| 6,631,234 B1 | 10/2003 | Russell et al. |
| 6,636,678 B1 | 10/2003 | Bendett et al. |
| 6,654,522 B2 | 11/2003 | Chandalia et al. |
| 6,665,471 B1 | 12/2003 | Farmer et al. |
| 6,696,142 B2 | 2/2004 | Baer et al. |
| 6,697,192 B2 | 2/2004 | Fan et al. |
| 6,717,655 B2 | 4/2004 | Cheng et al. |
| 6,754,006 B2 | 6/2004 | Barton et al. |
| 6,765,724 B1 | 7/2004 | Kramer |
| 6,798,960 B2 | 9/2004 | Hamada |
| 6,813,405 B1 | 11/2004 | Bendett et al. |
| 6,813,429 B2 | 11/2004 | Price et al. |
| 6,819,871 B1 | 11/2004 | Baldwin et al. |
| 6,822,796 B2 | 11/2004 | Takada et al. |
| 6,829,421 B2 | 12/2004 | Forbes et al. |
| 6,833,946 B2 | 12/2004 | Islam |
| 6,836,607 B2 | 12/2004 | Dejneka et al. |
| 6,845,108 B1 | 1/2005 | Liu et al. |
| 6,845,204 B1 | 1/2005 | Broeng et al. |
| 6,865,344 B1 | 3/2005 | Johnson et al. |
| 6,882,431 B2 | 4/2005 | Teich et al. |
| 6,898,339 B2 | 5/2005 | Shah et al. |
| 6,901,197 B2 | 5/2005 | Hasegawa et al. |
| 6,914,916 B2 | 7/2005 | Pezeshki et al. |
| 6,917,631 B2 | 7/2005 | Richardson et al. |
| 6,937,795 B2 | 8/2005 | Squires et al. |
| 6,950,692 B2 | 9/2005 | Gelikonov et al. |
| 6,952,510 B1 | 10/2005 | Karlsen et al. |
| 6,954,564 B2 | 10/2005 | Bendet |
| 6,958,859 B2 | 10/2005 | Hoose et al. |
| 6,959,130 B2 | 10/2005 | Fauver et al. |
| 6,960,027 B1 | 11/2005 | Krah et al. |
| 6,961,356 B2 | 11/2005 | Brown |
| 6,963,354 B1 | 11/2005 | Scheps |
| 6,965,469 B2 | 11/2005 | Avizonis et al. |
| 6,970,494 B1 | 11/2005 | Bendett et al. |
| 6,996,343 B2 | 2/2006 | Neilson |
| 7,043,127 B2 | 5/2006 | Hasegawa et al. |
| 7,072,553 B2 | 7/2006 | Johnson et al. |
| 7,106,932 B2 | 9/2006 | Birks et al. |
| 7,113,327 B2 | 9/2006 | Gu et al. |
| 7,116,469 B2 | 10/2006 | Bragheri et al. |
| 7,136,559 B2 | 11/2006 | Yusoff et al. |
| 7,142,757 B1 | 11/2006 | Ward |
| 7,167,300 B2 | 1/2007 | Fermann et al. |
| 7,190,705 B2 | 3/2007 | Fermann et al. |
| 7,199,924 B1 * | 4/2007 | Brown et al. .................. 359/556 |
| 7,203,209 B2 | 4/2007 | Young et al. |
| 7,221,822 B2 | 5/2007 | Grudinin et al. |
| 7,227,814 B2 | 6/2007 | Frederick et al. |
| 7,242,835 B2 | 7/2007 | Busse et al. |
| 7,251,258 B2 | 7/2007 | Wise et al. |
| 7,256,930 B2 | 8/2007 | Liu |
| 7,280,730 B2 | 10/2007 | Dong et al. |
| 7,340,140 B1 | 3/2008 | Xu et al. |
| 7,349,589 B2 | 3/2008 | Temelkuran et al. |
| 7,349,611 B2 | 3/2008 | Broeng et al. |
| 7,372,880 B2 | 5/2008 | Jablonski et al. |
| 7,376,312 B2 | 5/2008 | Nawae et al. |
| 7,376,315 B2 | 5/2008 | Kurosawa et al. |
| 7,391,561 B2 | 6/2008 | Di Teodoro et al. |
| 7,397,832 B2 | 7/2008 | Dell'Acqua et al. |
| 7,403,677 B1 | 7/2008 | Zhao et al. |
| 7,414,780 B2 | 8/2008 | Fermann et al. |
| 7,424,185 B2 | 9/2008 | Glebov et al. |
| 7,424,193 B2 | 9/2008 | Galvanauskas |
| 7,429,734 B1 | 9/2008 | Tidwell |
| 7,471,705 B2 | 12/2008 | Gerstenberger et al. |
| 7,477,664 B2 | 1/2009 | Liu |
| 7,477,666 B2 | 1/2009 | Liu |
| 7,508,853 B2 | 3/2009 | Harter et al. |
| 7,519,253 B2 | 4/2009 | Islam |
| 7,532,656 B2 | 5/2009 | Yang et al. |
| 7,539,231 B1 | 5/2009 | Honea et al. |
| 7,558,300 B2 | 7/2009 | Dragic |
| 7,590,323 B2 | 9/2009 | Broeng et al. |
| 7,711,013 B2 | 5/2010 | Liu et al. |
| 7,768,700 B1 | 8/2010 | Savage-Leuchs |
| 7,782,912 B2 | 8/2010 | Harter et al. |
| 7,787,729 B2 | 8/2010 | Dong et al. |
| 7,792,166 B2 | 9/2010 | Borschowa |
| 7,872,794 B1 | 1/2011 | Minelly et al. |
| 2002/0181856 A1 | 12/2002 | Sappey et al. |
| 2003/0068150 A1 | 4/2003 | Ariel et al. |
| 2004/0033043 A1 | 2/2004 | Monro et al. |
| 2004/0076197 A1 | 4/2004 | Clarkson |
| 2005/0041702 A1 | 2/2005 | Fermann et al. |
| 2005/0169590 A1 | 8/2005 | Alkeskjold |
| 2006/0067632 A1 | 3/2006 | Broeng et al. |
| 2006/0204190 A1 | 9/2006 | Ranka et al. |
| 2006/0233554 A1 | 10/2006 | Ramachandran et al. |
| 2007/0035810 A1 | 2/2007 | Henderson |

OTHER PUBLICATIONS

Di Teodoro, Fabio, et al., "MW peak-power, mJ pulse energy, multi-kHz repetition rate pulses", "Proc. of SPIE", 2006, pp. 61020K.1-61020K.8, vol. 6102.

Farrow, Roger L., et al., "Compact fiber lasers for efficient high-power generation", "Proceedings of the SPIE", 2006, pp. 62870C-1-62870C-6, vol. 6287, No. 62870C.

Loftus, T.H., et al., "Spectrally Beam-Combined Fiber Lasers for High-Average-Power Applications", "IEEE Journal of Selected Topics in Quantum Electronics", May 1, 2007, pp. 487-497, vol. 13, No. 3.

Shay, et al., "First experimental demonstration of self-synchronous phase locking of an optical array", "Optics Express", Dec. 11, 2006, pp. 12015-12021, vol. 14, No. 25.

Augst, S.J., et al., "Wavelength beam combining of ytterbium fiber lasers", "Opt. Lett.", 2003, pp. 331-333, vol. 28, No. 5.

Blaze Photonics (Crystal Fibre Company), "HC-580-01 'yellow'—Hollow Core Photonic Bandgap Fiber (product description)", "http://www.crystal-fibre.com/datasheets/HC-580-01.pdf", Feb. 10, 2006.

Blazephotonics (Company), "High NA Multimode Fiber MM-37-01 Product Description", "http://www.crystal-fibre.com/datasheets/MM-37-01.pdf", 2005.

Brooks, Christopher D, et al., "1-mJ energy, 1-MW peak-power, 10-W averagepower, spectrally narrow, diffraction-limited pulses from a photonic-crystal f", "Optics Express", Oct. 31, 2005, pp. 8999-9002, vol. 13, No. 22.

Champert, P.A., et al., "3.5 W frequency-doubled fiber-based laser source at 772 nm", "Applied Physics Letters", Apr. 23, 2001, pp. 2420-2421, vol. 78, No. 17.

Chen et al., "Laser-to-Fiber Coupling Scheme by Utilizing a Lensed Fiber Integrated with a Long-Period Fiber Grating", "IEEE Photonics Technology Letters", May 2000, pp. 501-503, vol. 12, No. 5.

Cooper, L.J., et al., "High-power Yb-doped multicore ribbon fiber laser", Nov. 1, 2005, pp. 2906-2908, vol. 30, No. 21.

Crystal Fibre (Company), "High-Power Fiber Laser and Amplifier Subassembly Modules Product Description", "http://www.crystal-fibre.com/products/subassemblies.shtm", 2005 (copyright).

Crystal Fibre (Company), "Multimode Ultra High NA Photonic Crystal Fiber MM-HNA-110 Product Description", "http://www.crystal-fibre.com/datasheets/MM-HNA-110.pdf", Apr. 2005.

Crystal Fibre (Company), "Multimode Ultra High NA Photonic Crystal Fiber MM-HNA-200 Product Description", "http://www.crystal-fibre.com/datasheets/MM-HNA-200.pdf", Apr. 2005.

Crystal Fibre (Company), "Multimode Ultra High NA Photonic Crystal Fiber MM-HNA-35 Product Description", "http://www.crystal-fibre.com/datasheets/MM-HNA-35.pdf", Apr. 2005.

Crystal Fibre (Company), "Multimode Ultra High NA Photonic Crystal Fiber MM-HNA-5 Product Description", "http://www.crystal-fibre.com/datasheets/MM-HNA-5.pdf", Apr. 2005.

Crystal Fibre (Company), "Towards 100 kW fiber laser systems Scaling up power in fiber lasers for beam combining", "http://www.crystal-fibre.com/support/White_Paper_-_Towards_100kWfiber_laser_systems_-_Scaling_up_power_in_fiber_lasers_for_beam_combining.pdf", Feb. 28, 2006.

Davitt, Kristina, et al., "290 and 340 nm UV LED arrays for fluorescence detection from single airborne particles", "Optics Express", Nov. 14, 2005, pp. 9548-9555, vol. 13, No. 23.

Di Teodoro, Fabio, et al., "Diffraction-limited, 300-kW peak-power pulses from a coiled multimode fiber amplifier", "Optics Letters", Apr. 1, 2002, pp. 518-520, vol. 27, No. 7.

Di Teodoro, Fabio, et al., "1.1 MW peak-power, 7 W average-power, high-spectral-brightness, diffraction-limited pulses from a photonic crystal fiber", "Optics Letters", Oct. 15, 2005, pp. 2694-2696, vol. 30, No. 20.

Di Teodoro, Fabio, et al., "Harmonic generation of an Yb-doped photonic-crystal fiber amplifier to obtain 1ns pulses of 410, 160, and 190kW peak-pow", "Advanced Solid-State Photonics 29 Technical Digest, Paper ME3", 2006.

Dunne, Mike, "Laser-driven particle accelerators", "Science", Apr. 21, 2006, pp. 374-376, vol. 312.

Fan, T.Y., "Laser Beam Combining for High-Power, High Radiance Sources", "IEEE Journal of Selected Topics in Quantum Electronics", 2005, pp. 567-577, vol. 11.

Furusawa, et al., "Cladding pumped Ytterbium-doped fiber laser with holey inner and outer cladding.", "Optics Express", Dec. 17, 2001, pp. 714-720, vol. 9, No. 13.

Galvanauskas, Almantas, "Mode-scalable fiber-based chirped pulse amplification systems", "IEEE Journal on Selected Topics in Quantum Electronics", Jul. 2001, pp. 504-517, vol. 7, No. 4.

Galvanauskas, A., et al., "Fiber-laser-based femtosecond parametric generator in bulk periodically poled LiNb03", "Optics Letters", Jan. 15, 1997, pp. 105-107, vol. 22, No. 2.

Han, H.-S., et al., "Coefficient determination related to optical gain in erbium-doped silicon-rich silicon oxide waveguide amplifier", "Appl. Phys. Lett.", Nov. 22, 2002, pp. 3720-3722, vol. 81, No. 20.

Hehl, Karl, et al., "High-efficiency dielectric reflection gratings: design, fabrication, and analysis", "Appl. Opt.", 1999, pp. 6257-6271, vol. 38.

Henderson, Angus, et al., "Low threshold, singly-resonant CW OPO pumped by an all-fiber pump source", "Optics Express", Jan. 3, 2006, pp. 767-772, vol. 14, No. 2.

Kik, P.G., et al., "Exciton-erbium energy transfer in Si nanocrystal-doped SiO2", "J. Appl. Phys.", Aug. 15, 2000, pp. 1992-1998, vol. 88, No. 4.

Kik, P.G., et al., "Strong exciton-erbium coupling in Si nanocrystal-doped SiO2", "Applied Physics Letters", Apr. 24, 2000, pp. 2325-2327, vol. 76, No. 17.

Kik, P.G., et al., "Exciton-erbium energy transfer in Si nanocrystal-doped SiO2", "Materials Science and Engineering", 2001, pp. 3-8, vol. B81.

Krause, J.T., et al., "Arc Fusion Splices with Near Pristine Strengths and Improved Optical Loss", "22nd European Conference on Optical Communication", 1996, p. 2.237-2.240.

Kristiansen, Rene E., et al., "Microstructured fibers and their applications", "Proceedings of the 4th Reunion Espanola of Optoelectronics (OPTOEL), CI-5", 2005, pp. 37-49.

Liem, A., et al., "100-W single-frequency master-oscillator fiber power amplifier", "Optics Letters", Sep. 1, 2003, pp. 1537-1539, vol. 28, No. 17.

Limpert, J., et al., "High power Q-switched Yb-doped photonic crystal fiber laser producing sub-10 ns pulses", "Appl. Phys. B 81", 2005, pp. 19-21.

Limpert, J., et al., "High-power rod-type photonic crystal fiber laser", "Optics Express", Feb. 21, 2005, pp. 1055-1058, vol. 13, No. 4.

Limpert, J., et al., "Low-nonlinearity single-transverse-mode ytterbium-doped photonic crystal fiber amplifier", "Optics Express", Apr. 5, 2004, pp. 1313-1319, vol. 12, No. 7.

Liu, F., et al., "Cost-effective wavelength selectable light source using DFB fibre laser array", "Electronics Letters", Mar. 30, 2000, pp. 620-621, vol. 36, No. 7.

Liu, A., et al., "Spectral beam combining of high power fiber lasers", "Proceedings of SPIE", Jun. 7, 2004, pp. 81-88, vol. 5335.

Moutzouris, Konstantinos, et al., "Highly efficient second, third and fourth harmonic generation from a two-branch femtosecond erbium fiber source", "Optics Express", Mar. 6, 2006, pp. 1905-1912, vol. 14, No. 5.

Orsila, Lasse, et al., "Three- and four-level transition dynamics in Yb-fiber", "Optics Express", May 2, 2005, pp. 3218-3223, vol. 13, No. 9.

Perry, M.D., et al., "High-efficiency multilayer dielectric diffraction gratings", "Opt. Lett.", 1995, pp. 940-942, vol. 20.

Roser, F., et al., "131 W 220 fs fiber laser system", "Optics Letters", Oct. 15, 2005, pp. 2754-2756, vol. 30, No. 20.

Schreiber, T., et al., "Stress-induced single-polarization single-transverse mode photonic crystal fiber with low nonlinearity", "Optics Express", Sep. 19, 2005, pp. 7621-7630, vol. 13, No. 19.

"Sensor Systems for Biological Agent Attacks: Protecting Buildings and Military Bases", 2005, p. 73 Publisher: Committee on Materials and Manufacturing Processes for Advanced Sensors, National Research Council.

Sorensen, T., et al., "Metal-assisted coupling to hollow-core photonic crystal fibres", "Electronics Letters", Jun. 9, 2005, vol. 41, No. 12.

Tunnermann, A., et al., "The renaissance and bright future of fibre lasers", "Journal of Physics B: Atomic, Molecular and Optical Physics", 2005, pp. S681-S693, vol. 38.

* cited by examiner

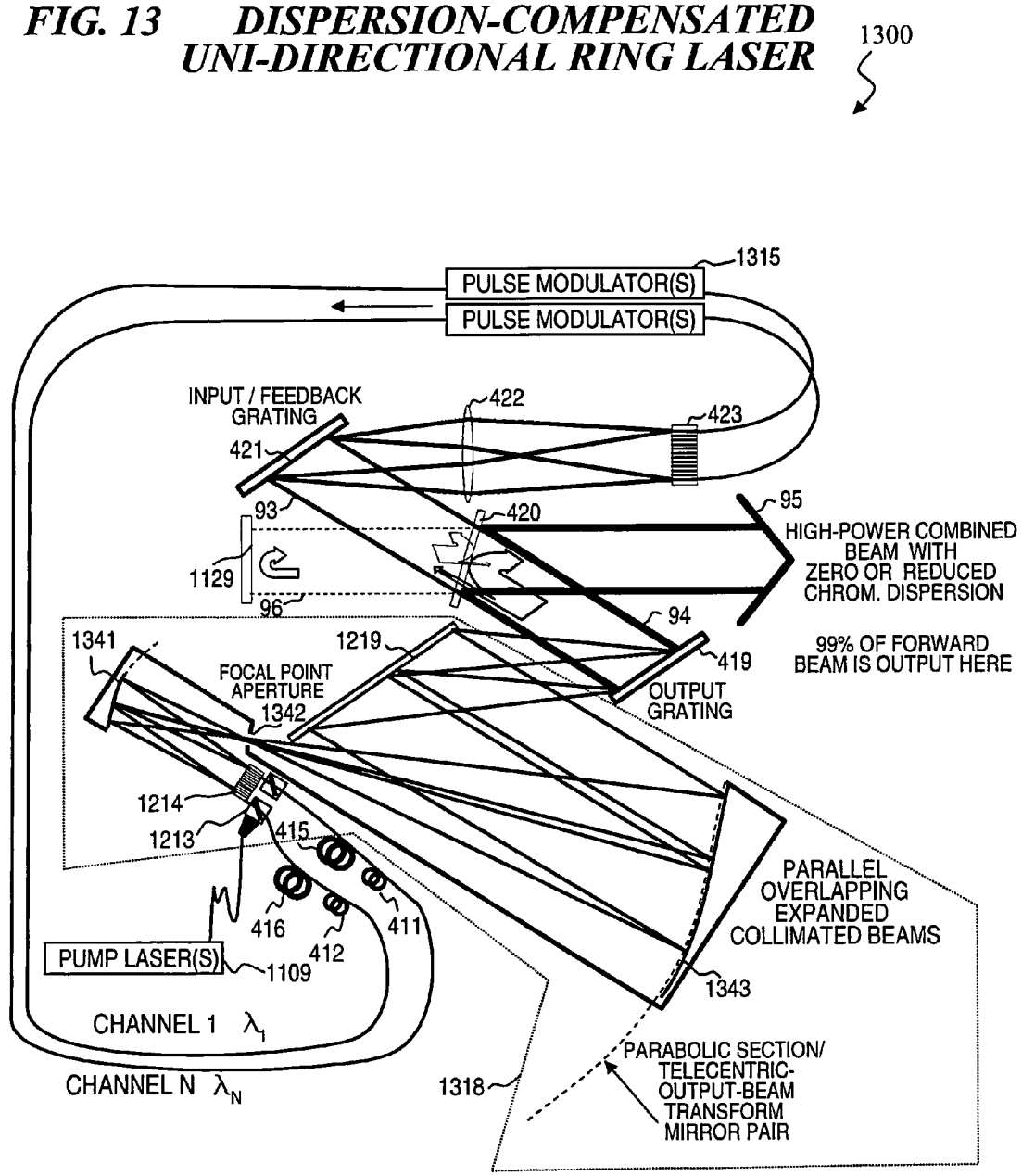
*FIG. 13* DISPERSION-COMPENSATED UNI-DIRECTIONAL RING LASER

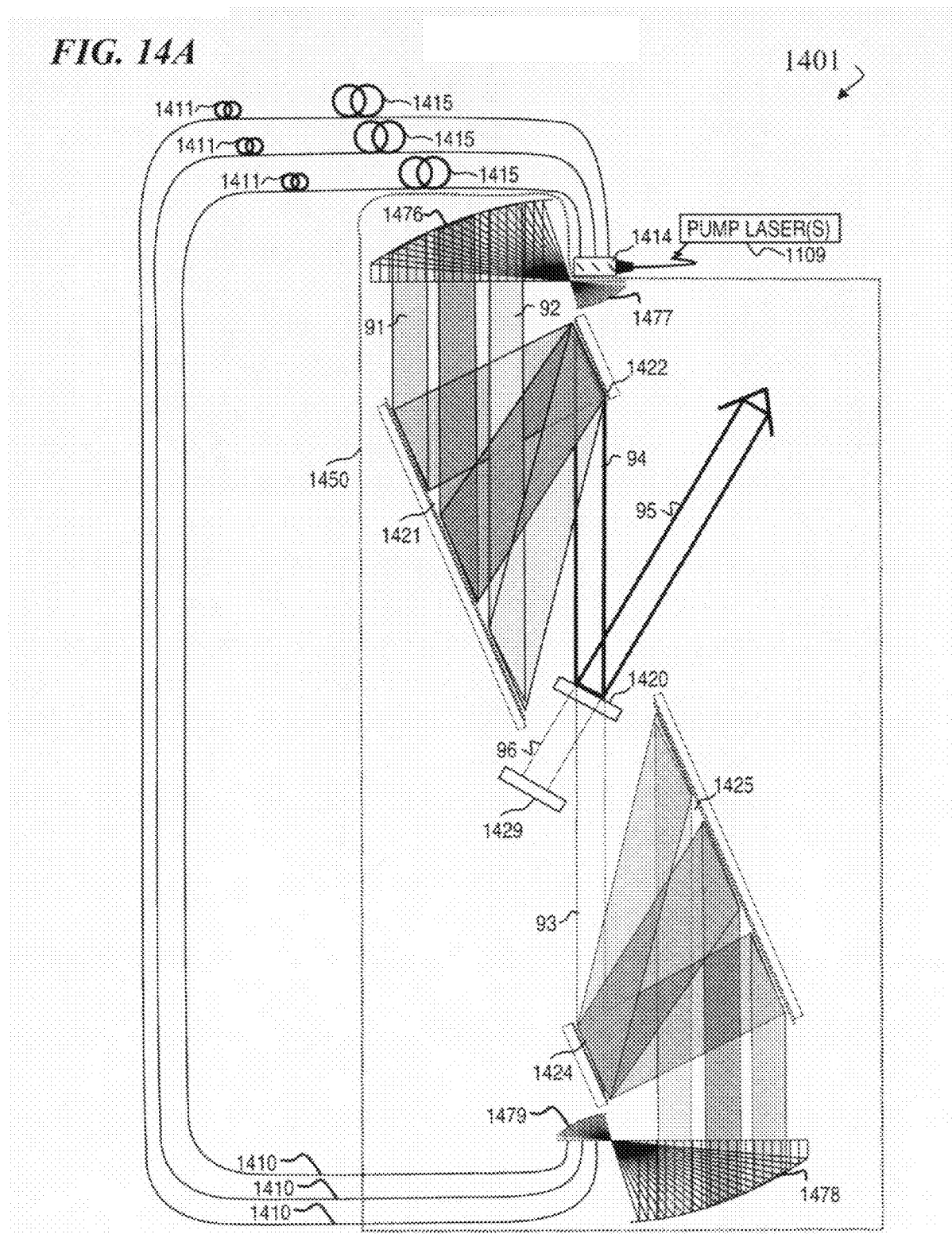

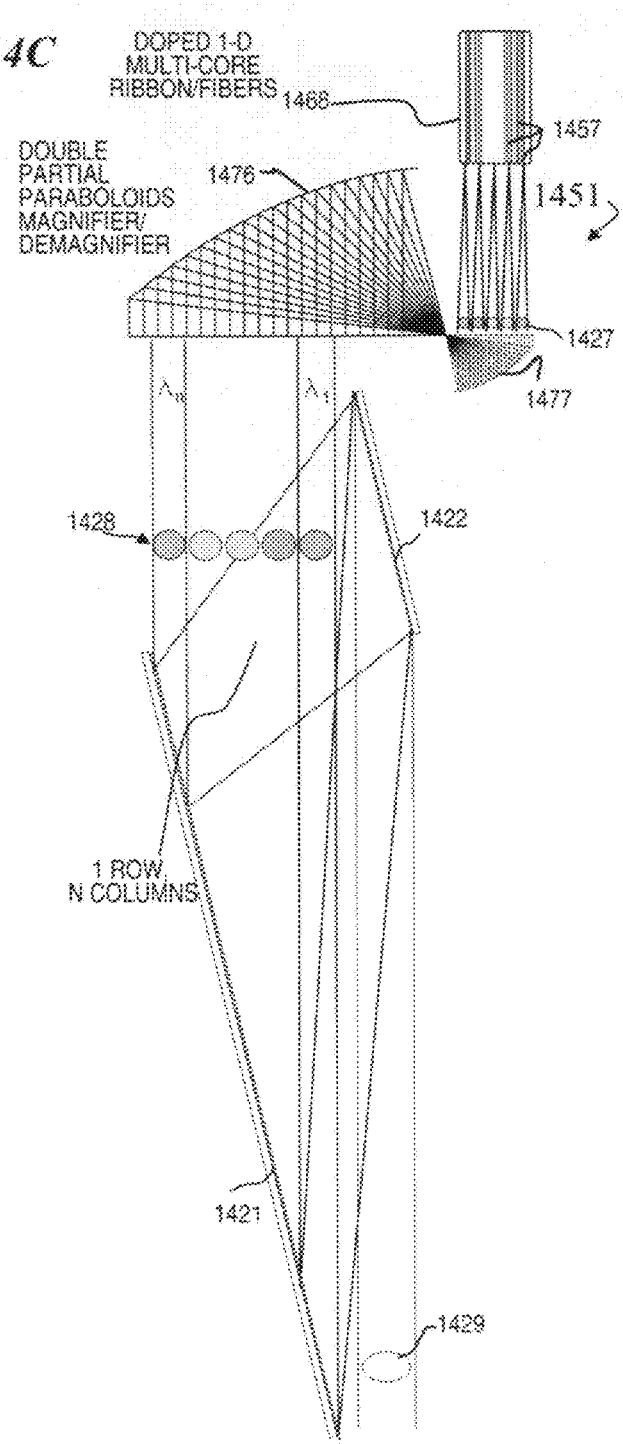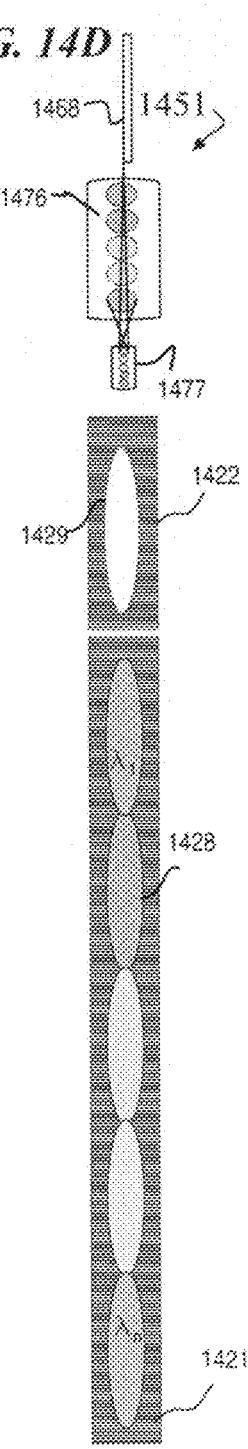

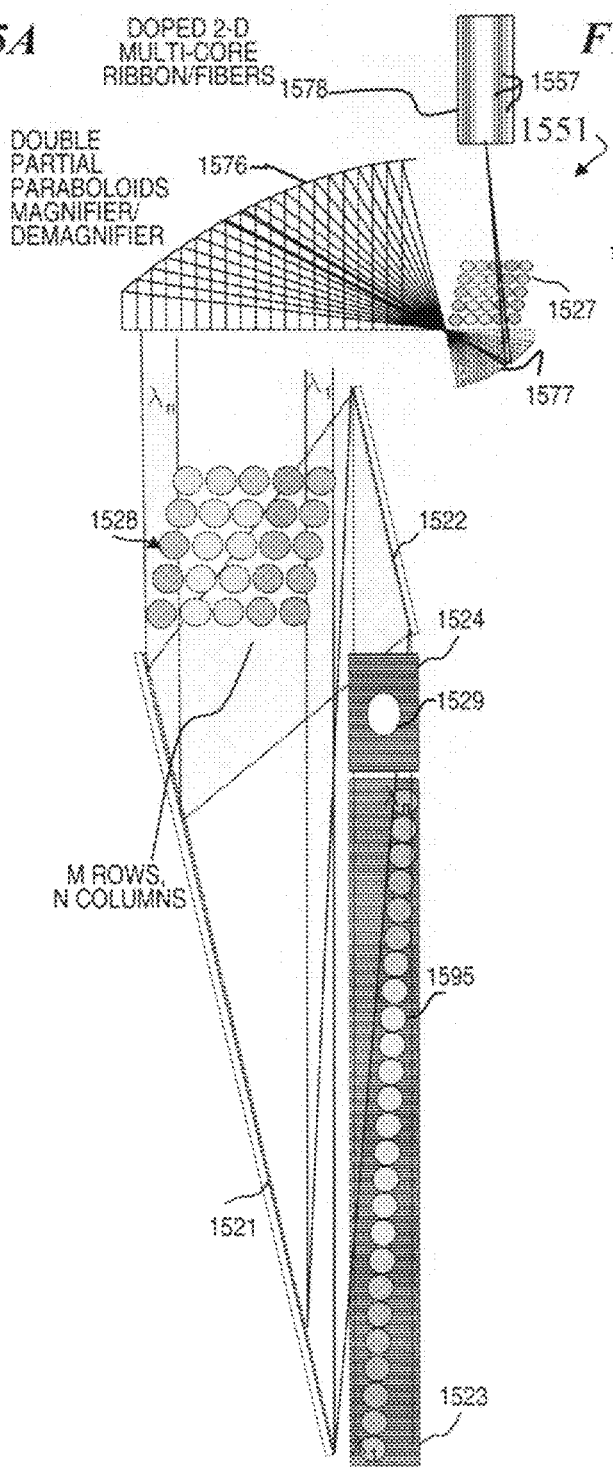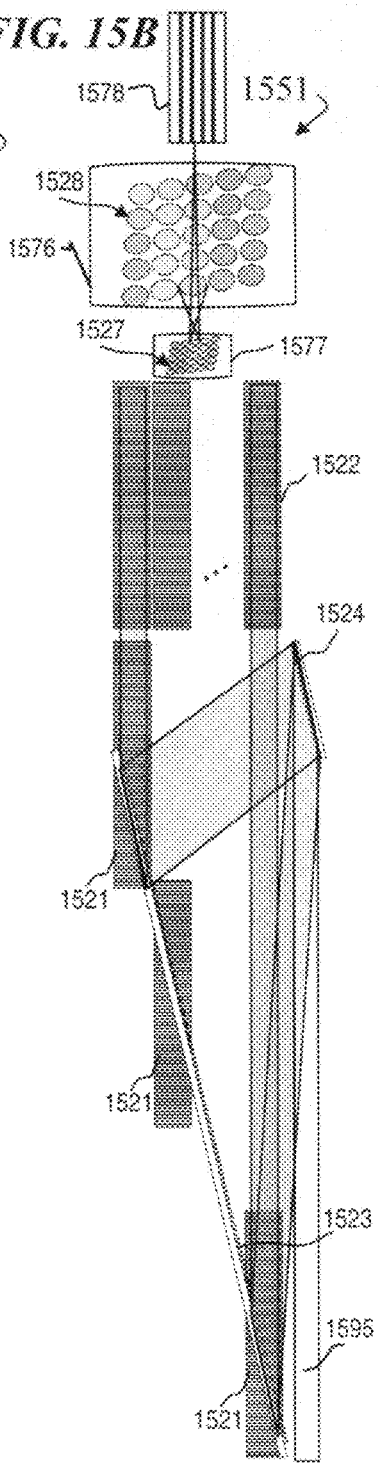

SPECTRAL-BEAM COMBINING FOR HIGH-POWER FIBER-RING-LASER SYSTEMS

RELATED APPLICATIONS

This application claims benefit under 35 U.S.C. §119(e) of U.S. Provisional Patent Application No. 61/029,304, filed Feb. 15, 2008, which is incorporated herein by reference in its entirety.

The application is related to U.S. Pat. No. 7,199,924, filed Jan. 26, 2006 and issued Apr. 3, 2007, titled APPARATUS AND METHOD FOR SPECTRAL-BEAM COMBINING OF HIGH-POWER FIBER LASERS, U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, U.S. patent application Ser. No. 12/053,551 filed Mar. 21, 2008 and titled HIGH-POWER, PULSED RING FIBER OSCILLATOR (which issued as U.S. Pat. No. 7,876,803 on Jan. 25, 2011), U.S. patent application Ser. No. 12/165,651 filed Jun. 30, 2008 and titled METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS (which issued as U.S. Pat. No. 8,179,594 on May 15, 2012), U.S. patent application Ser. No. 11/484,358 filed Jul. 10, 2006 and titled APPARATUS AND METHOD FOR PUMPING AND OPERATING OPTICAL PARAMETRIC OSCILLATORS USING DFB FIBER LASERS (which issued as U.S. Pat. No. 7,620,077 on Nov. 17, 2009), U.S. Pat. No. 7,471,705 filed Nov. 9, 2006 and titled ULTRAVIOLET LASER SYSTEM AND METHOD HAVING WAVELENGTH IN THE 200-NM RANGE, U.S. patent application Ser. No. 12/169,628 filed Jul. 8, 2008 and titled MICRO-STRUCTURED FIBER PROFILES FOR MITIGATION OF BEND-LOSS AND/OR MODE DISTORTION IN LMA FIBER AMPLIFIERS, INCLUDING DUAL CORE EMBODIMENTS (which issued as U.S. Pat. No. 7,924,500 on Apr. 12, 2011), each of which is incorporated herein by reference in its entirety for all purposes.

FIELD OF THE INVENTION

The present invention relates to ring lasers and spectral beam combining, and more particularly to an apparatus and method of spectral-beam combining beams from a plurality of ring lasers having different wavelengths using high-efficiency optical elements such as, for example, dielectric-coated focussing mirrors and dielectric-coated gratings, some embodiments of which provide chromatic-dispersion compensation to improve the beam quality and to reduce beam spreading due to chromatic dispersion of the individual beams.

BACKGROUND OF THE INVENTION

Fast advances in the development of Yb-doped fiber lasers have changed the landscape of high-power lasers during the last decade. Yb-doped fiber lasers uniquely combine the diffraction-limited beam quality, distributed thermal loading and compact and modular packaging of fiber systems with high electrical-to-optical efficiency and broad gain bandwidth of Yb-gain medium that translates to high-average-power compact systems over a wide wavelength range. The fiber lasers have demonstrated up to a few thousand Watts (kW) with broad linewidths but the fiber laser output power is not expected to scale much beyond 10 kW due to thermal loading and optical nonlinear effects.

To scale the output power of fiber-laser systems further, beam-combination approaches have been proposed and they are broadly classified into coherent-beam combination and spectral-beam combination. Both approaches require narrow linewidths on the order of a few GHz, which makes the power scaling of individual fiber laser channels challenging, primarily due to limitation posed by stimulated Brillouin scattering (SBS) in fiber. (Stimulated Brillouin scattering (SBS) is a well-known phenomenon that can lead to power limitations or even the destruction of a high-power fiber-laser system due to sporadic or unstable feedback, self-lasing, pulse compression and/or signal amplification.) Innovations in fiber and component technologies and fiber-laser designs have pushed the power to a few hundred Watts at narrow linewidths and expected to push the power to a few kW in the coming years. Beam-combination approaches can potentially combine multiple fiber-laser channels and scale the output power of fiber laser systems over 100 kW.

Coherent-beam combination involves vectorially summing the output from multiple lasers by phase locking the individual emitters to a single frequency (1: T. M. Shay, V. Benham, J. T. Baker et al., "First experimental demonstration of self-synchronous phase locking of an optical array", Opt. Exp., 14, 12022-12027 (2006)). Coherent-beam combination produces spectrally bright beams but suffers from multi-lobed far-field transverse profiles with off-axis sidelobes. Approaches to reduce the sidelobe power in coherent combining have also been explored (2: S. Christensen, "Novel coherent beam combiner," presented at the Solid State Diode Laser Technol. Rev., Albuquerque, N. Mex., Jun. 13-15, (2006), Paper BC-4; and 3: T. Y. Fan, "Laser beam combining for high-power, high-radiance sources", IEEE J. Quantum Electron., vol. 11, 567-577 (2005)).

Spectral-beam combination (SBC) circumvents the problem of sidelobe power in transverse-field profiles by trading spectral brightness for spatial brightness (4: E. J. Bochove, "Theory of spectral beam combining of fiber lasers," IEEE J. Quantum Eletron., 38, 432-445 (2002); and 5: S. J. Augst, A. K. Goyal, R. L. Aggarwal, T. Y. Fan and A. Sanchez, "Wavelength beam combining of ytterbium fiber lasers," Opt. Lett., 28, 331-333 (2003)). In SBC, a diffraction grating is used to merge spectrally distinct output from multiple fiber lasers to a spatially bright diffraction-limited beam. Lockheed Martin Aculight Corporation has demonstrated over 500 W of output using SBC with efficiency and beam quality rivaling that of the individual fiber-laser output. Several SBC techniques have been demonstrated at Lockheed Martin Aculight Corporation and in this application some of the experimental results obtained at Lockheed Martin Aculight Corporation are described.

The present invention describes improvements and builds upon important SBC ring-laser ideas and designs that were co-developed by Eric C. Honea, Thomas H. Loftus and Bernard G. Deuto.

With a simple optical design, it is possible to construct a compact SBC system that operates with a large number of emitters to produce a collimated output beam with the combined wavelengths. FIG. 1 is a schematic illustration of a linear-oscillator SBC system 100 where a partial reflector 140 provides feedback to each gain element 110 at the wavelength needed to provide a single output beam 69, where some of the beam 68 is reflected back to the grating 130, and focussing element 120 into gain elements 110 originally reported by Daneu et al. for an array of diode emitters (6: V. Daneu, A. Sanchez, T. Y. Fan, H. K. Choi, G. W. Turner, and C. C. Cook, "Spectrally beam combining of broad stripe diode laser array in an external cavity," Opt. Lett., vol. 25, pp. 405-407 (2000)). System 100 has the disadvantage that the highest-power beam (output beam 69) passes through the output reflector 140, which can result in undesirable energy absorption in the output reflector 140. System 100 also has the disadvantage that output beam 69 continues to chromatically disperse after it diffracts from uncompensated grating 130 and passes through the output reflector 140, which can result in undesirable beam quality. The grating equation defines the wavelengths in the system according to:

$$\Delta\lambda = \frac{(\Delta x) d \cos(\theta_g)}{f} \quad (1)$$

Here, $\Delta x$ is the spacing between laser emitters 110, d is the spacing of the grating line grooves of grating 130, $\theta_g$ is the grating diffraction angle, f the focal length of the collimation lens/mirror 120, and $\Delta\lambda$ the wavelength difference between emitters 110 in order to produce a single collimated output beam 69. The focal length typically defines the longest dimension in the optical system 100, with hundreds of elements easily combined in a compact optical system. For instance, with a 1,600-line/mm grating, a focal length of 40 cm, a grating angle of 58 degrees and a wavelength spread of 1040-1060 nm, one obtains an array width of ~2.5 cm. With a fiber spacing of 250 microns, this corresponds to approximately one-hundred (100) gain elements. Tighter element spacing, or a longer focal length, enables the combination of larger numbers of elements.

The linear-oscillator approach has been applied to both diode-laser and fiber-laser arrays. The design has been applied to a number of diode array configurations, including an array of 200 single-mode lasers within a single diode-laser bar (7: S. C. Tidwell et al, "Spectral beam combining of diode-laser bars achieve efficient near diffraction limited output power," Proc. SPIE 4973-08 (2003)) and an array of 1,400 single-mode lasers from seven diode-laser bars (8: C. Hamilton, S. Tidwell, D. Meekhof, J. Seamans, N. Gitkind and D. Lowenthal, "Spectral beam combining of a broad-stripe diode laser array in an external cavity," Proc. SPIE, 5336-1 (2004)).

One of the challenges in early applications of the optical design of FIG. 1 to fiber lasers was the operation of the fiber lasers as linear oscillators with the required narrow linewidth. Narrow-linewidth operation of fiber linear oscillators has shown limited power scaling (9: A. Liu, R. Mead, T. Vatter, A. Henderson and R. Stafford, "Spectral beam combining of high power fiber lasers," Proceedings of SPIE 5335, 81-88 (2004)). High-power, narrow-line-width operation has been demonstrated in master-oscillator power-amplifier (MOPA) fiber-laser configurations. Scientists at Lockheed Martin Aculight Corporation have developed 200-300-W MOPA fiber lasers with the required linewidth and polarized output for SBC. Using these MOPA lasers, we have demonstrated SBC of two- and three-fiber lasers (10: T. Loftus et al., "Spectrally Beam-Combined Fiber Lasers for High-Average-Power Applications" IEEE Journal of Selected Topics in Quantum Electronics, Volume 13, Issue 3, 487-497 (2007)) with over 500 Watts and near-diffraction-limited output.

FIG. 2A is a schematic illustration of a prior-art spectral-beam combination of two fiber laser channels (beams 71 and 72 from fiber lasers 210, where the fiber ends are held by a spatial array 212) using a transform lens 220 (or a focusing reflector, not shown, used in its place to perform a corresponding focusing function) and a single output grating 230. The resulting output beam 79 in FIG. 2A has the advantage of not passing through an output reflector 140, as was the case for output beam 69 of FIG. 1, but still has the disadvantage of chromatic dispersion introduced by the output grating 230. FIG. 2B is a schematic diagram of a Gaussian beam with a finite spectral linewidth $\Delta\lambda$, diffracted by a grating. In some embodiments, unlike the configuration in FIG. 1, master-oscillator power-amplifier (MOPA) lasers are used wherein the wavelength and linewidth of each channel are set with an external seed source (e.g., a master oscillator, which feeds a seed signal into a power amplifier that outputs one of the laser beams 71-72 in the MOPA SBC configuration), rather than wavelength-dispersed optical feedback from a partially reflecting mirror, such as mirror 140 of FIG. 1, and grating 130. One can analyze the linewidth requirements for the fiber MOPA systems by considering the dependence of the combined beam quality on the single-channel linewidth for a simple single-grating SBC system, consisting of a fiber array, a transform optic, and a single diffraction grating to combine the beam (see FIG. 2A).

Consider a single-mode Gaussian beam with a linewidth $\Delta\lambda$, incident on a diffraction grating as shown in FIG. 2B. For simplicity, one can assume the Rayleigh range for the beam is much longer than other length scales of interest (this is true for beam diameters larger than a few mm). The beam quality for the diffracted beam is then given by $$BQ = \frac{\omega_1 \theta_1}{\omega_0 \theta_0} \quad (2)$$

where $\omega_0$ and $\theta_0$ ($\omega_1$ and $\theta_1$) are the $1/e^2$ beam radius and divergence, respectively, for the incident (diffracted) beam. For a flat-top spectral profile within $\Delta\lambda$, the angular spread for the diffracted output beam 69 (FIG. 1) or 79 (FIG. 2A and FIG. 2B) is increased because of the grating:

$$\theta_1 = \frac{\cos(\alpha_1)}{\cos(\beta_1)}\theta_0 + \Delta\theta = \frac{\cos(\alpha_1)}{\cos(\beta_1)}\theta_0 + \frac{g\Delta\lambda}{2\cos(\beta_1)} \quad (3)$$

Considering a more realistic situation where the single-channel output power is distributed within a Gaussian spectral envelope with a $1/e^2$ width of $\Delta\lambda$, Equation 3 becomes $$\theta_1 = \theta_0 \sqrt{1 + \left(\frac{g\Delta\lambda}{2\theta_0 \cos(\alpha_1)}\right)^2} \quad (4)$$

and $M^2$ for the combined beam is given by $$M^2 = \sqrt{1 + \left(\frac{g\Delta\lambda}{2\theta_0 \cos(\alpha_1)}\right)^2} \quad (5)$$

At this point, it is useful to note that the peak irradiance on the grating and the combined beam quality are inversely related to $\omega_0$. Specifically, using $\theta_0=(\lambda/\pi\omega_0)$, Equation 5 can be written as:

$$M^2 = \sqrt{1 + \left(\frac{g\Delta\lambda\pi\omega_0}{2\lambda\cos(\alpha_1)}\right)^2}. \quad (6)$$

while for a SBC system with total output power P, the peak irradiance on the grating is given by $$I_{peak} = \frac{2P}{\left(\frac{\pi\omega_2^2}{\cos(\alpha_1)}\right)} \quad (7)$$

From the above equations, one sees that for given values of $\Delta\lambda$ and g, increasing $\omega_0$ decreases $I_{peak}$ (i.e., the thermal load on the grating) but simultaneously reduces the combined beam quality. Together Equations 6 and 7 then define a trade space that can be used to determine the required single-channel linewidth for a given combined beam quality and grating peak irradiance goal.

FIG. 3 is a graph that gives the required single-channel linewidth $\Delta\lambda$ for a 10-kW, single-grating SBC fiber laser with a combined beam quality $M^2=1.25$. For the plot in FIG. 3, we show the linewidth for $I_{peak}$ values of 1.5 kW/cm$^2$ and 6 kW/cm$^2$ versus the grating groove density g. For high-dispersion gratings (>1500 lines/mm) one sees that the linewidth requirement is 10 to 20 pm (10-20 picometers linewidth, which is about 2.5-5 GHz) for even these modest intensities. For fiber lasers where one of the key nonlinearities is stimulated Brillouin scattering (SBS), this relatively large linewidth, compared to the Brillouin linewidth, simplifies high-power scaling.

The broad gain bandwidth of conventional fiber-laser systems allows for operation over a wide range of wavelengths, or even tunable operation. For the simplest fiber-laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

It is desirable to produce high peak- and average powers from fiber lasers and amplifiers. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth-doped (RE-doped) double-clad fiber with a large core. The large core provides two benefits: Spreading the light over a larger core decreases the intensity driving the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system.

U.S. Pat. No. 6,324,016 issued to Luster on Nov. 27, 2001 titled TELECENTRIC LENS, and is incorporated herein by reference. Luster described a reflective telecentric lens which uses an on-axis type concave mirror in a pseudo-off-axis manner to avoid blockage of a portion of the field of view. The concave mirror used in a pseudo-off-axis manner permits the telecentric stop, imaging lens, and film or an electronic detector to be moved outside of the field of view.

U.S. Pat. No. 6,822,796 to Takada et al. titled "DIFFRACTIVE OPTICAL ELEMENT" (incorporated herein by reference) describes a method for making blazed gratings having asymmetric grooves with dielectric coatings. U.S. Pat. No. 6,958,859 to Hoose et al. titled "GRATING DEVICE WITH HIGH DIFFRACTION EFFICIENCY" (incorporated herein by reference) describes a method for making blazed gratings having dielectric coatings.

U.S. Pat. No. 5,907,436 titled "MULTILAYER DIELECTRIC DIFFRACTION GRATINGS" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 7,424,185 titled "STRETCHING AND COMPRESSION OF LASER PULSES BY MEANS OF HIGH EFFICIENCY VOLUME DIFFRACTIVE GRATINGS WITH VARIABLE PERIODS IN PHOTO-THERMO-REFRACTIVE GLASS" issued Sep. 9, 2008 to Glebov et al., and is incorporated herein by reference. This patent describes the design and fabrication of high-efficiency reflective volume Bragg gratings with chirped gratings recorded in photo-thermo-refractive glass having an absolute diffraction efficiency exceeding 95% in transmitting and reflecting modes, which are used to stretch and/or compress ultrashort laser pulses with high efficiency. Glebov et al. describe placement of multiple elements in a compact space, which provides their femtosecond laser system with high efficiency of stretching and re-compression of femtosecond pulses.

There is a need for improved high-power laser systems, particularly fiber-based ring lasers and, in particular, systems that use spectral-beam combining.

SUMMARY OF THE INVENTION

The present invention provides an improved laser system that spectral-beam combines laser beams from a plurality of ring lasers. In some embodiments, high-efficiency dielectric-coated diffraction gratings and focussing reflectors are used for at least a portion of the optical paths of the ring lasers in order to reduce energy absorption by the optical elements. In some embodiments, one or more chromatic-dispersion-compensation gratings are used to reduce or prevent chromatic dispersion of the output beam. In some embodiments, optical gain fibers are used for at least part of the gain sections of each of a plurality of the ring lasers. In some embodiments, the optical gain fibers are doped with one or more rare-earths. In some embodiments, at least part of each of the plurality of ring lasers include photonic-crystal rods, multi-core photonic-crystal ribbons and/or photonic-crystal fibers having large-mode-area cores and have small numerical apertures. In some embodiments, the output reflector is highly reflective (in order to reflect the large majority of the power of the ring lasers from its front surface, so that power does not pass though the element) and has a low transmissive ratio (in order to provide feedback to the ring lasers). In some embodiments, a highly reflective backward-wave reflector is used on the low-power side of the output reflector in order that the large majority of the power of the backward wave is reflected back to the output reflector where it is then largely reflected in the forward direction around the ring, helping to ensure one-directional lasing around the ring.

In some embodiments, the output stage includes a mostly reflective but partially transmissive output mirror and a highly reflective beam-reversing mirror configured to reflect a majority of a backward-traveling signal beam such that it becomes forward traveling. In some embodiments, each gain element further includes a photonic-crystal-rod power amplifier. Some embodiments have an amplitude modulator (e.g., an electronically controlled acousto-optical modulator) configured to pulse the plurality of beams. Some embodiments further include a timing controller configured to synchronize the resulting pulses of the plurality of beams. Some embodiments further include a non-linear wavelength-conversion device (e.g., a wavelength doubler (or the like), or an optical parametric oscillator or amplifier).

In some embodiments, the present invention provides an apparatus that includes a ring-laser system having a plurality of ring-laser gain elements and a spectral-beam-combining output stage configured to combine a plurality of beams coming from the gain elements into an output beam and that includes chromatic-dispersion compensation. Some embodiments further include a power supply, pump lasers, beam steering devices and the like, as well as entire systems that use the output beam. In some embodiments, such entire systems include military vehicles, aircraft or watercraft, or laser medical systems, or laser printers, or other devices that can use the output beam described herein.

In some embodiments, the present invention provides method that includes chromatic-dispersion compensating each of a plurality of laser beams coming from a plurality of gain elements, spectral-beam combining the plurality of chromatic-dispersion compensated beams into a combined intermediate output beam, outputting a majority of the combined intermediate output beam as an output beam, separating a remaining portion of the combined intermediate output beam into different wavelengths, and using the different wavelengths as feedback in a ring configuration to the plurality of gain elements.

BRIEF DESCRIPTION OF THE DRAWINGS

FIG. 13 is a block diagram of a chromatic-dispersion-compensated spectral-beam-combining ring laser system 1300 that uses a reflector outside of the high-power paths to ensure unidirectional travel of the lasing beams around the rings and high-efficiency dielectric-coated reflective optics in the high-power paths, and optionally includes pulse components.

FIG. 14A is a block diagram of a chromatic-dispersion-compensated spectral-beam-combining ring laser system 1401 that uses a reflector outside of the high-power paths to ensure unidirectional travel of the lasing beams around the rings and high-efficiency dielectric-coated reflective optics in all paths.

FIG. 14C is a plan-view block diagram of a chromatic-dispersion-compensated spectral-beam-combining focussing- and diffractive-element system 1451 used in some embodiments of the ring-laser systems described herein.

FIG. 14D is an elevation-view block diagram of chromatic-dispersion-compensated spectral-beam-combining focussing- and diffractive-element system 1451.

FIG. 15A is a plan-view block diagram of a chromatic-dispersion-compensated spectral-beam-combining focussing- and diffractive-element system 1551 used in some embodiments of the ring-laser systems described herein.

FIG. 15B is an elevation-view block diagram of chromatic-dispersion-compensated spectral-beam-combining focussing- and diffractive-element system 1551.

DESCRIPTION OF EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
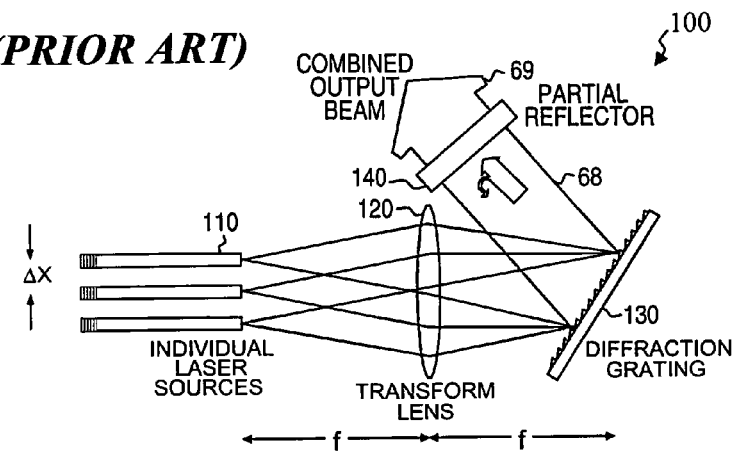
FIG. 1 is a block diagram of a prior-art spectral-beam-combining (SBC) laser system 100.
Figure 2A:
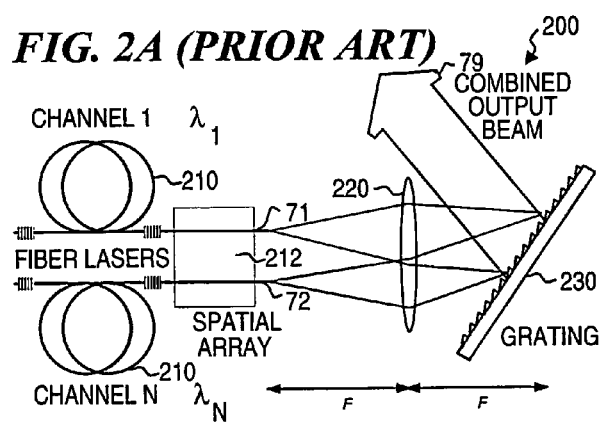
FIG. 2A is a block diagram of a prior-art spectral-beam-combining fiber-laser system 200.
Figure 2B:
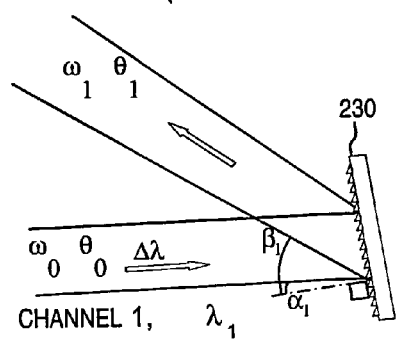
FIG. 2B is a block diagram of a prior-art spectral-beam-combining output grating 230 showing chromatic dispersion of the output of one of the channels of the SBC fiber-laser system 200 of FIG. 2A.
Figure 3:
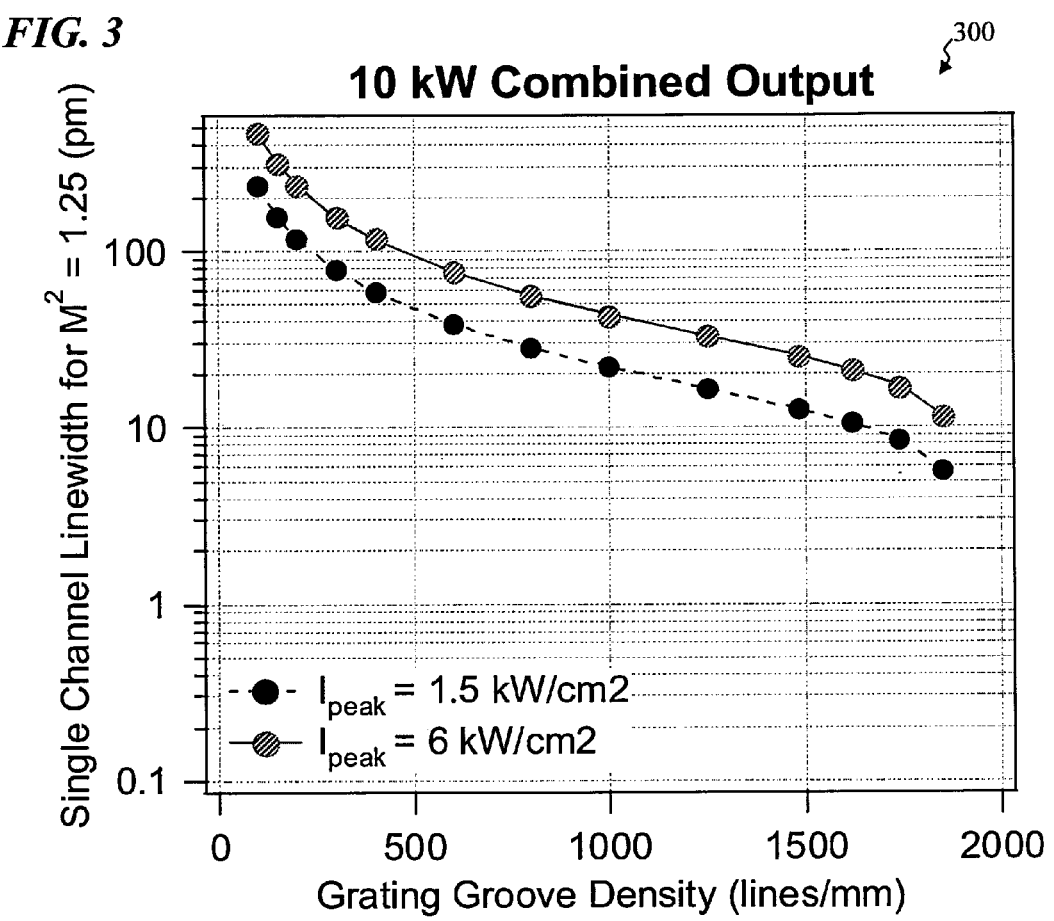
FIG. 3 is a graph 300 of single-channel linewidth versus groove density.

One of the challenges in a multi-channel SBC system is to have the wavelength of individual channels tuned to the correct wavelength for beam combination by a grating. For SBC systems with large number of channels, the system complexity is reduced significantly by having the grating select the wavelength in an oscillator configuration. Linear-oscillator SBCs have been demonstrated before, but because of the feedback being provided to the power amplifier, the system is unstable and prone to self-pulsing. Ring-oscillator SBC system 400 (schematic configuration shown in FIG. 4) avoids the instabilities of a linear-oscillator SBC (such as system 100 of FIG. 1) by providing the wavelength-specific optical feedback to the low-power pre-amplifiers while retaining the advantage of automatically setting the channel wavelength and bandwidth.

Figure 4:
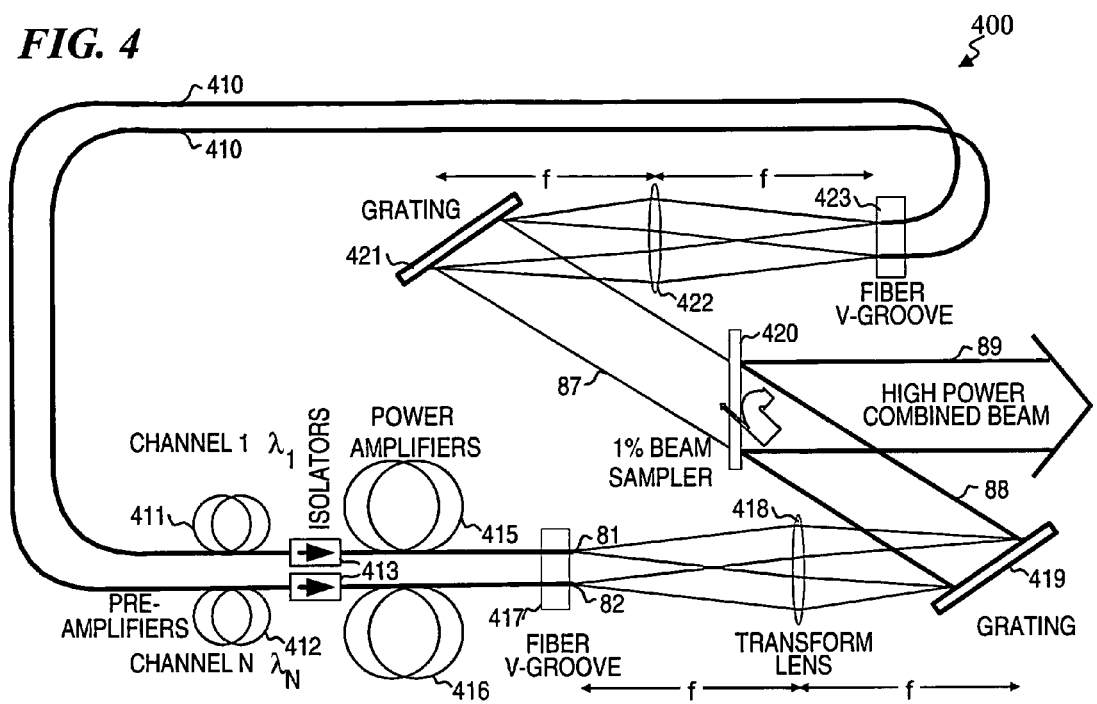
FIG. 4 is a block diagram of a spectral-beam-combining ring laser system 400 that uses in-line isolators to help ensure unidirectional travel of the lasing beams around the rings.

FIG. 4 is a schematic diagram of a ring SBC system 400. In some embodiments, system 400 includes a plurality of optical fibers 410 (the two shown, plus optionally one or more others located at spaced-apart positions between those shown) coupled to fiber input v-groove block 423 to receive chromatically dispersed optical feedback from grating 421 and focusing element 422 (e.g., a lens or mirror). The optical signals in fibers 410 are each amplified by their respective preamplifier 411-412, and respective power amplifier 415-416. In some embodiments, an optical isolator 413 is provided for each optical path between the respective preamplifiers 411-412, and respective power amplifiers 415-416. The output end of each fiber is held by fiber output v-groove block 417. In some embodiments, each fiber's output end has a beam-expanding endcap and/or a hollow-core fiber termination, such as are described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. The plurality of output beams 81-82 (plus optionally one or more others) are each collimated by focusing element 418 (e.g., a lens as shown, or a diffractive focussing optical element or mirror that perform the corresponding function) into their own respective angularly converging collimated beam that each impinge onto grating 419 at a different angle, and due to their respective different wavelengths, each is spectrally combined into a single beam 88. In some embodiments, a mostly reflective, but partially transmissive, output mirror 420 (also called a beam sampler 420) reflects most of beam 88 into output beam 89, which, due to the single output grating 419, has chromatic dispersion. In some embodiments, output mirror 420 reflects about 99% of beam 88 into output beam 89, and transmits about 1% as feedback beam 87, which is then diffracted by input grating 421 and focused by focusing element 422 (e.g., a lens as shown, or a diffractive focussing optical element or mirror that perform the corresponding function) such that each different wavelength is directed into its own respective optical fiber 410 held by fiber input v-groove block 423.

In the ring SBC system 400, the output from multiple-fiber channels is combined using a grating, just as in a single-grating MOPA system, but a portion of the combined beam is separated into the individual wavelengths using a second grating (in some embodiments, one that is identical to the first grating) and fed back to form the ring oscillator. The analysis of the beam quality of the combined beam (FIG. 7a) is similar to the single grating MOPA system and the combined beam quality is given by Equation 7. Even though the linewidth requirement of the ring SBC is similar to the single-grating SBC system, the system complexity is significantly reduced in the ring SBC system because the wavelength and linewidth of the individual fiber lasers are automatically set by the system. This is particularly advantageous for a system with a large number of channels.

Figure 5:
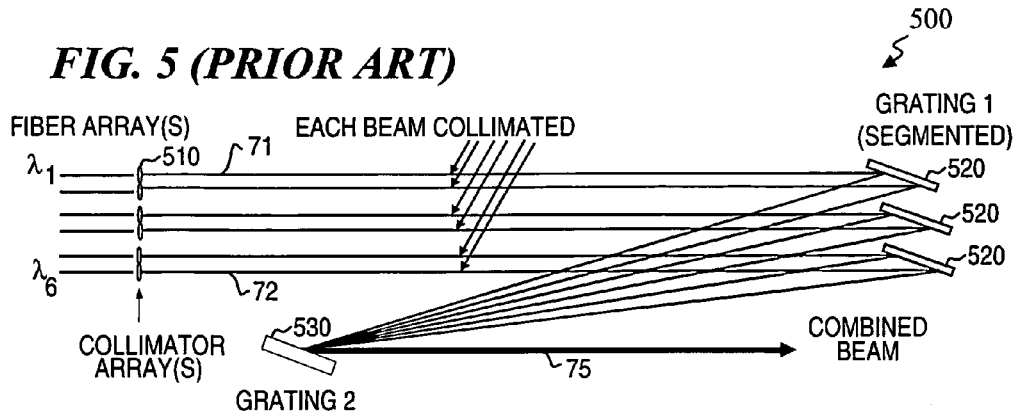
FIG. 5 is a block diagram of a prior-art chromatic-dispersion-compensating spectral-beam-combining fiber laser system 500 that uses a segmented compensation grating.

FIG. 5 is a schematic diagram of a prior-art multi-channel segmented two-grating system 500, such as described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. In some embodiments, the first grating 520 is segmented into multiple pieces for convenience and/or to make approximately equal the respective path lengths between the respective chromatic-dispersion-compensating grating pieces 520 and output grating 530 in order that the as-dispersed widths of each of the beams 71 and 72 (plus optionally one or more others) are approximately equal when they impinge onto output grating 530. In some such embodiments, the respective spacings of the input collimating lenses 510 (and the optical fibers or other elements that provide the light for beams 71-72) are adjusted such that the respective convergence angles of the beams onto output grating 530 will combine into the single chromatic-dispersion-compensated output beam 75.

In some embodiments, dual-grating fiber SBC systems (such as shown in FIG. 5) mitigate the impact of $\Delta\lambda$ on the combined beam quality by using a second grating (with parameters identical to the first) to "re-collimate" the combined beam. This configuration trades $\Delta\theta$ for an increased combined beam diameter (in one transverse axis) due to the $\Delta\lambda$ induced spreading between the gratings 520 and grating 530. As shown below, degrees of freedom beyond the grating groove density and $\theta_0$ can then be used to reduce the impact of $\Delta\lambda$ on the combined beam $M^2$.

In some embodiments, system 500 includes of a linear array of independently collimated fiber lasers whose parallel outputs are directed to one or more diffraction grating 520. The output wavelengths for the fiber lasers are set such that $\lambda_0 < \lambda_1 < \lambda_2 \ldots < \lambda_n$ with channel 1 (wavelength $\lambda_1$) at one side of the array and channel n (wavelength $\lambda_n$) at the other side of the array. The grating maps the array of input beams 71-72 to an array of diffracted beams (with wavelength-dependent diffraction angles) and directs the diffracted beams to a second grating 530, located at a distance L from the first grating(s) 520, where the beams are spatially overlapped. The individual beams are then diffracted by the second grating 530 into a common exit angle and thus multiplexed into a single combined beam 75.

From the grating equation, it is clear that for each channel, the diffracted beam from the second grating is parallel to the incident beam on the first grating and has the same angular divergence $$\theta_2 = \theta_0; \alpha_2 = \beta_1; \beta_2 = \alpha_{1\alpha} \quad (8)$$

where $\alpha_2$ ($\beta_2$) is the incidence (diffraction) angle for the second grating. The $1/e^2$ radius for the diffracted beam after the second grating is then found by calculating the anamorphic magnification after each grating and accounting for the increase in beam size along one transverse axis (see reference number 1429 in FIG. 14C) due to the $\Delta\lambda$ induced spreading between the gratings $$\omega_2 = \frac{\cos(\alpha_2)}{\cos(\beta_2)} \left( \omega_0 \frac{\cos(\beta_1)}{\cos(\alpha_1)} + \frac{Lg\Delta\lambda}{2\cos(B_1)} \right) = \omega_0 + \frac{Lg\Delta\lambda\cos(\alpha)}{\cos^2(\beta)} \quad (9)$$

where in the last step, we have assumed incidence angles near Littrow for which $\alpha_1 = \beta_1 = \alpha_2 = \beta_2 = \alpha = \beta$. Hence, the beam quality after diffraction from the second grating is given by $$M^2 = \frac{\omega_2 \theta_0}{\omega_0 \theta_0} = 1 + \frac{g\Delta\lambda\cos(\alpha)}{2\omega_0 \cos^2(\beta)} L \quad (10)$$

The distance L is given by $$L = \frac{x\cos^2(\beta_{n+1})}{g(\lambda_n - \lambda_{n+1})\cos(\alpha)} \quad (11)$$

Therefore the beam quality following diffraction from the second grating (i.e., the combined beam quality) is given by $$M^2 = 1 + \frac{x\Delta\lambda}{2\omega_0(\lambda_n - \lambda_{n+1})} \quad (12)$$

Figure 6A:
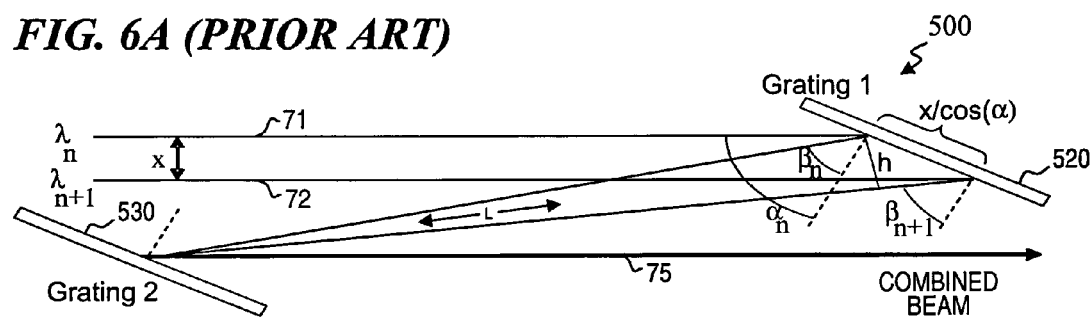
FIG. 6A is a block diagram of prior-art spectral-beam-combining output grating 530 and compensation grating 520 showing chromatic dispersion compensation of the output beam.
Figure 6B:
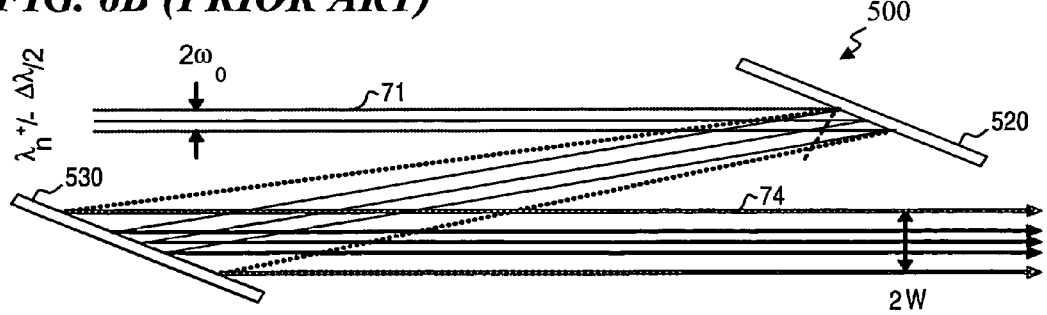
FIG. 6B is a block diagram of prior-art spectral-beam-combining output grating 530 and compensation grating 520 showing chromatic dispersion compensation of the output of one of the channels of the SBC fiber-laser system 500 of FIG. 5.

FIG. 6A is a schematic illustration of two adjacent channels in the dual-grating fiber SBC system 500. The two beams are collimated (each to have a beam-waist diameter of $2\omega_0$) and separated from each other by a distance x. The gratings 520 and 530 are separated by an optical path length of L. FIG. 6B is a schematic drawing of the increased final beam size (having a beam-waist diameter of $2\omega_0$ across one transverse axis (the non-dispersed axis, which is perpendicular to the paper) and a diameter of "2W" across the perpendicular dispersed axis, which is up-down in the FIG. 6B) due to the angular spreading after the first grating. The second grating stops additional angular spreading due to chromatic dispersion.

The distance L between the gratings is inversely proportional to the channel-to-channel wavelength interval ($\lambda_n - \lambda_{n+1}$) and the grating groove density g. Minimizing the SBC system size therefore requires using high-dispersion gratings and a small number of fiber channels whose output wavelengths are spread over the maximum available wavelength band.

SBC Experimental Results

Single Grating MOPA

Figure 7A:
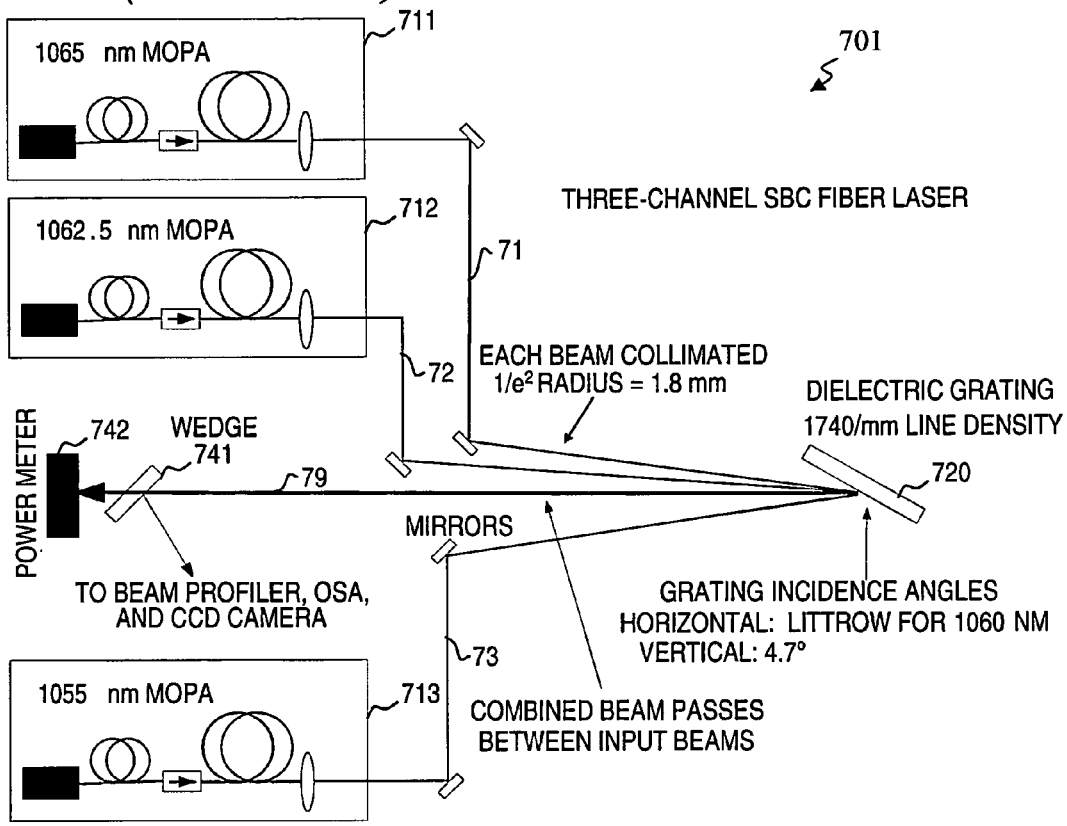
FIG. 7A is a block diagram of a prior-art spectral-beam-combining laser system 701.
Figure 7B:
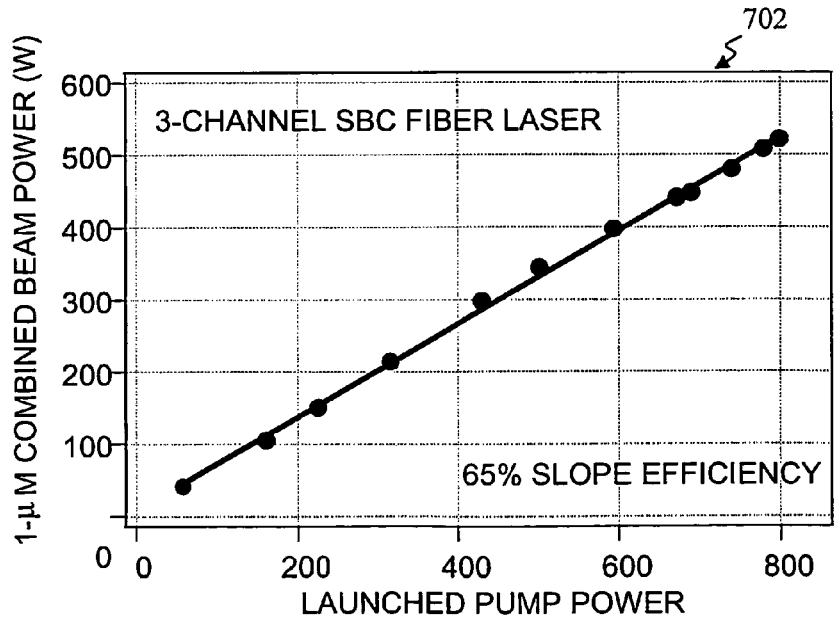
FIG. 7B is a graph 702 of single-channel linewidth versus groove density.

The single-grating SBC system was demonstrated with three fiber-laser channels (schematically shown in FIG. 7A) with a maximum output power of 522 W and slope efficiency of 65% (see the graph 702 of FIG. 7B).

FIG. 7A is a block diagram of the optical layout of a prior-art single-grating spectral-beam-combining laser system 701. In some embodiments, system 701 includes a plurality of MOPA lasers 711, 712, and 713, which output intermediate laser beams 71, 72, and 73, respectively. These intermediate laser beams are spectrally combined into a single output beam 79, some of which is reflected by wedge 741 to a beam profiler, an optical spectrum analyzer (OSA) and a charge-coupled-device imager (CCD camera), and the rest of which is measured by power meter 742. FIG. 7B is a graph 702 of single-channel linewidth versus groove density. The individual channel contributions to the combined beam are 158 W at 1055 nm, 176 W at 1062.5 nm and 188 W at 1065 nm and the individual fiber amplifier output powers are 7% higher than the channel contributions to the combined beam since the SBC power-combining efficiency is 93%. The combined beam was near diffraction limited with a beam quality $M^2$ of 1.18 along the dispersed axis of the grating and 1.22 along the non-dispersed axis. FIG. 7B (which depicts combined beam power, at approximately 1-μm wavelength, versus the total launched pump power for the 3-channel SBC fiber laser 701) clearly demonstrates that SBC fiber lasers can produce high-average-power beams while nearly maintaining the electrical-to-optical efficiency of individual Yb-fiber lasers. The maximum output is 522 W and the slope efficiency is ~65%, roughly the product of the single-channel slope efficiency and the SBC power-combining efficiency.

Ring SBC

The ring SBC concept was demonstrated with two low-power fiber-laser channels producing 5-6 W each. The optical schematic is shown in FIG. 8A.

Figure 8A:
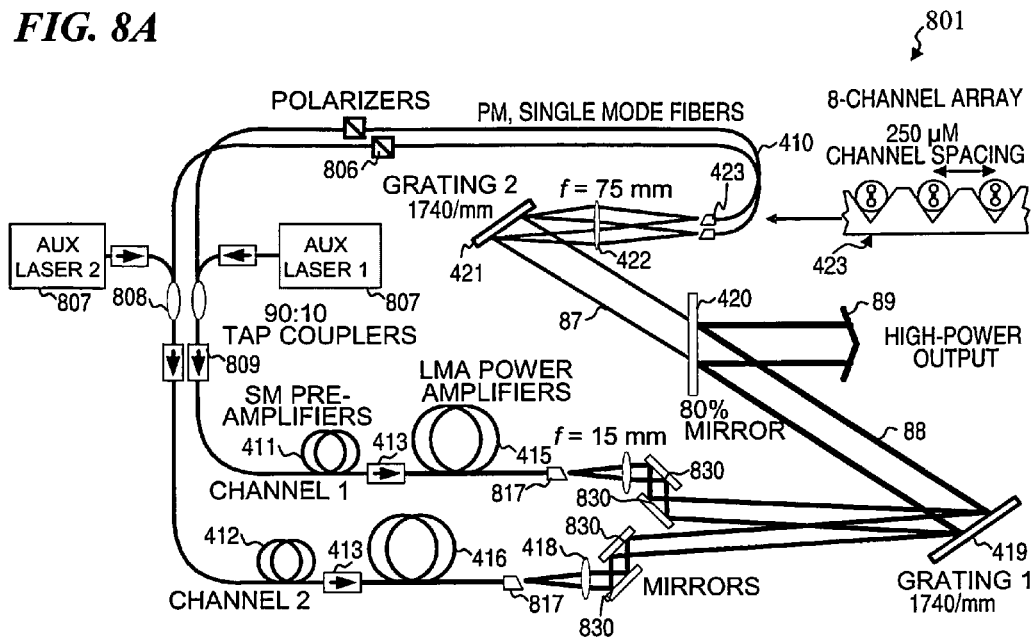
FIG. 8A is a block diagram of a spectral-beam-combining ring laser system 801 that uses several in-line isolators to ensure unidirectional travel of the lasing beams around the rings.

FIG. 8A is a block diagram of a spectral-beam-combining ring laser system 801 that uses several in-line isolators to ensure unidirectional travel of the lasing beams around the rings. System 801 is conceptually similar to system 400 of FIG. 4. In some embodiments, system 801 includes a plurality of optical fibers 410 (the two shown, plus optionally one or more others located at spaced-apart positions between those shown) coupled to fiber input v-groove block 423 to receive chromatically dispersed optical feedback from grating 421 and focusing element 422 (e.g., a lens or mirror). In some embodiments, polarization-maintaining (PM) fibers are used for fibers 410. In some embodiments, polarizers 806 are used to polarize each optical signal. In some embodiments, pump light is supplied by pump lasers 807 (each of which is optionally equipped with an isolator to prevent any backward-traveling light from damaging the pump lasers) and launched into each fiber using couplers 808. In some embodiments, isolators 809 prevent any backward-traveling signal light (e.g., SBS light or amplified spontaneous emission (ASE) light) from becoming a backward-traveling mode of the ring laser, thus ensuring unidirectional operation). The optical signals in fibers 410 are each amplified by their respective preamplifier 411-412, and respective power amplifier 415-416. In some embodiments, an optical isolator 413 is provided for each optical path between the respective preamplifiers 411-412, and respective power amplifiers 415-416, to prevent any backward-traveling signal light (e.g., SBS light or amplified spontaneous emission (ASE) light) of the power amplifiers 415-416 from depleting energy of the respective preamplifiers 411-412). In some embodiments, each fiber's output end 817 has a beam-expanding endcap and/or a hollow-core fiber termination, such as are described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. The plurality of output beams 81-82 are each collimated by a respective focusing element 418 (e.g., a lens as shown, or a diffractive focussing optical element or mirror that perform the corresponding function) which are then reflected by mirrors 830 into their own respective angularly converging collimated beam that each impinge onto grating 419 at a different angle, and due to their respective different wavelengths, each is spectrally combined into a single beam 88. In some embodiments, a mostly reflective, but partially transmissive, output mirror 420 (also called a beam sampler 420) reflects most of beam 88 into output beam 89, which, due to the single output grating 419, has chromatic dispersion. In some embodiments, output mirror 420 reflects about 80% of beam 88 into output beam 89, and transmits about 20% as feedback beam 87, which is then diffracted by input grating 421 and focused by focusing element 422 (e.g., a lens as shown, or a diffractive focussing optical element or mirror that perform the corresponding function) such that each different wavelength is directed into its own respective optical fiber 410 held by fiber input v-groove block 423.

In some embodiments, the outputs from the final gain stages 415 and 416 are each collimated using a 15-mm focal-length lens 418 and the two channels are combined using a diffraction grating 419. In some embodiments, the combined beam power is 10.1 W. A portion (20%) of the combined beam is tapped and coupled back to form the ring oscillators. The feedback optics include a grating 421, fiber array (fiber input v-groove block) 423 and a 75-mm-focal-length coupling lens 422. As discussed in section 2.3, the feedback optics determine the wavelength and linewidth of the ring oscillator. The ends of feedback fibers 410 are held in a COTS (commercial, off-the-shelf), 8-channel silicon v-groove assembly 423. In some embodiments, the channel-to-channel geometric spacing in the array is 250 μm. The experiment used two non-adjacent fibers spaced by 500 μm. The resulting channel-to-channel wavelength interval is 1.482 nm and the channel bandwidth is 9 pm (2.4 GHz), measured using a Fabry-Perot interferometer.

Figure 9A:
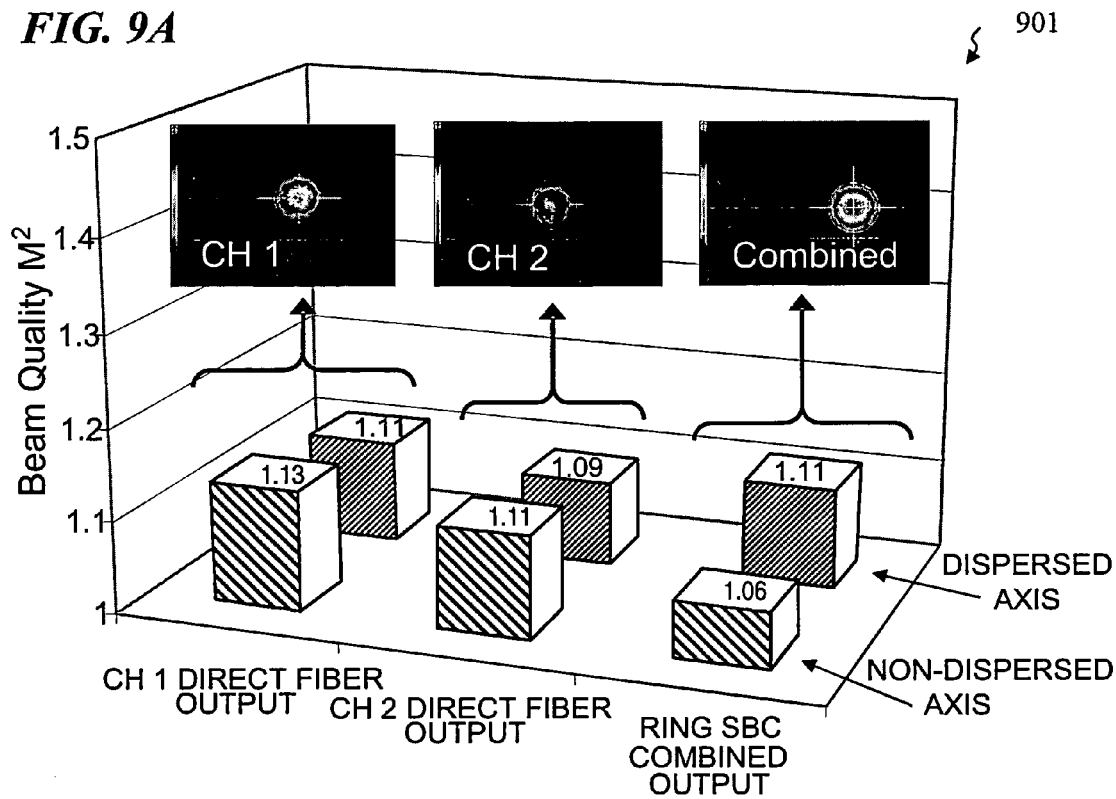
FIG. 9A is a graph 901 of beam quality for dispersed and non-dispersed axes in a SBC ring laser for each of two channels individually and when combined.
Figure 9B:
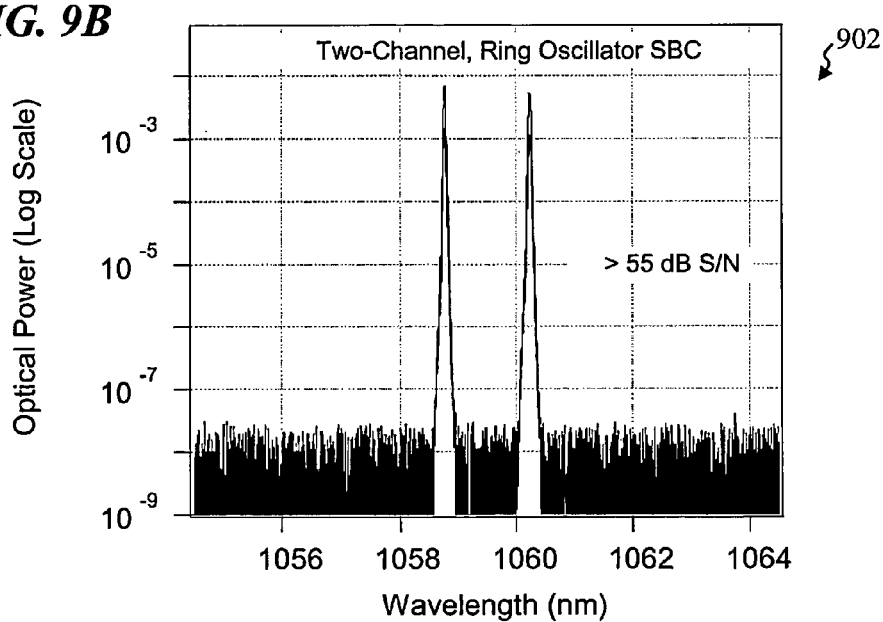
FIG. 9B is a graph 902 of intensity versus wavelength in the output of an SBC ring laser.

FIG. 9B is a graph 902 that shows the optical spectrum of the combined beam output (of output beam 89 of FIG. 7A, and FIG. 9A is a graph 901 that shows the beam qualities of the individual channels and the combined beam output. The beam quality is about $M^2 \sim 1.1$ for the individual channels and the combined output, without any degradation due to the beam combination.

Figure 8B:
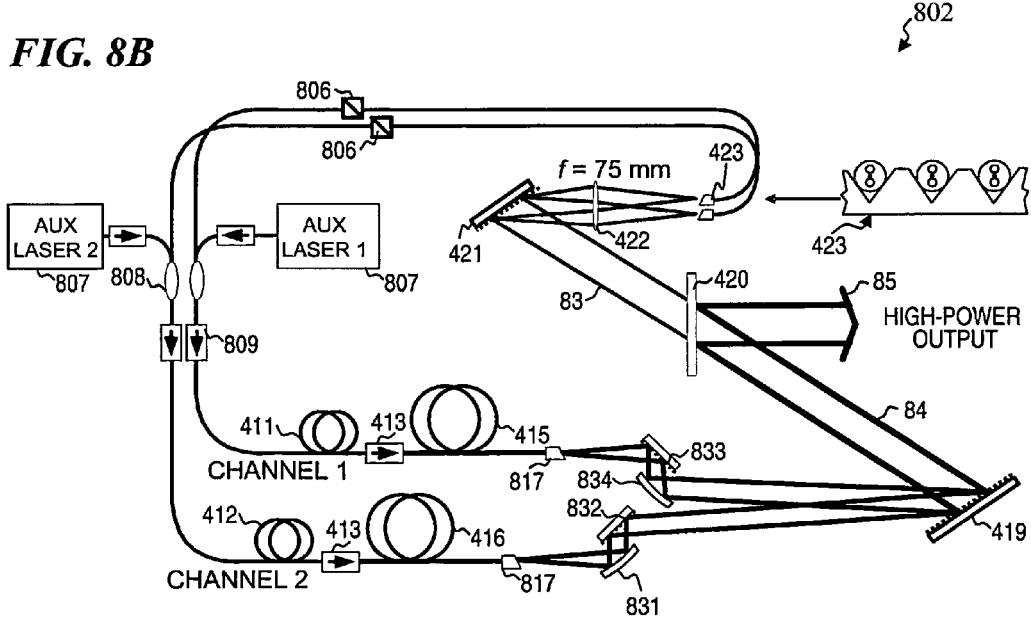
FIG. 8B is a block diagram of a spectral-beam-combining ring laser system 802 that uses several in-line isolators to ensure unidirectional travel of the lasing beams around the rings, but which also includes chromatic-dispersion compensation.

FIG. 8B is a block diagram of a spectral-beam-combining ring-laser system 802 that uses several in-line isolators (809 and/or 413) to ensure unidirectional travel of the lasing beams around the rings, but which also includes chromatic-dispersion compensation. In some embodiments, system 802 is similar to system 801 of FIG. 8A, with the exception that system 802 further includes chromatic-dispersion-compensating gratings 833 and 832, such that output beam 85 has little or no chromatic dispersion. In some embodiments, planar mirror 831 directs the intermediate output beam from power amplifier 416 to grating 832, which in some embodiments, has the same groove density as output grating 419, and is oriented parallel to output grating 419, in order to introduce a compensating dispersion. In some embodiments, mirror 831 is configured as a focussing optical element that collimates the expanding beam coming from termination end 817 of power amplifier 416. In some embodiments, one or more mirrors 831 are used in order to direct intermediate output beams from angles not in the plane of the Figure onto compensation grating 832.

In some embodiments, one or more of the compensation gratings (e.g., compensation grating 833, which in some embodiments, has the same groove density as output grating 419) is oriented at an angle relative to mirror 834 (which reverses the direction of dispersion) and relative to output grating 419, in order to introduce the compensating dispersion. In some embodiments, mirror 834 is configured as a focussing optical element that collimates the expanding beam coming from termination end 817 of power amplifier 415 that is diffracted first by grating 833. In some embodiments, two or more mirrors 834 are used in order to collimate and direct intermediate output beams from angles not in the plane of the Figure onto a single plane of angularly converging collimated beams directed onto output grating 419. Other aspects of FIG. 8B are as described above for FIG. 8A.

FIG. 9A is a graph 901 of beam quality (measured $M^2$) for the ring oscillator SBC fiber laser system 801 of FIG. 8A. The two-dimensional bar graph 901 includes $M^2$ across the dispersed axis and the non-dispersed axis for the direct fiber outputs (labeled CH1 DIRECT FIBER OUTPUT and CH2 DIRECT FIBER OUTPUT), along with $M^2$ for the two-channel combined beam (labeled RING SBC COMBINED OUTPUT) at 10 W output power.

FIG. 9B is a graph 902 of intensity versus wavelength that shows the optical spectrum for the combined beam 89 in SBC ring laser 801 for the two channels when combined.

Figure 9C:
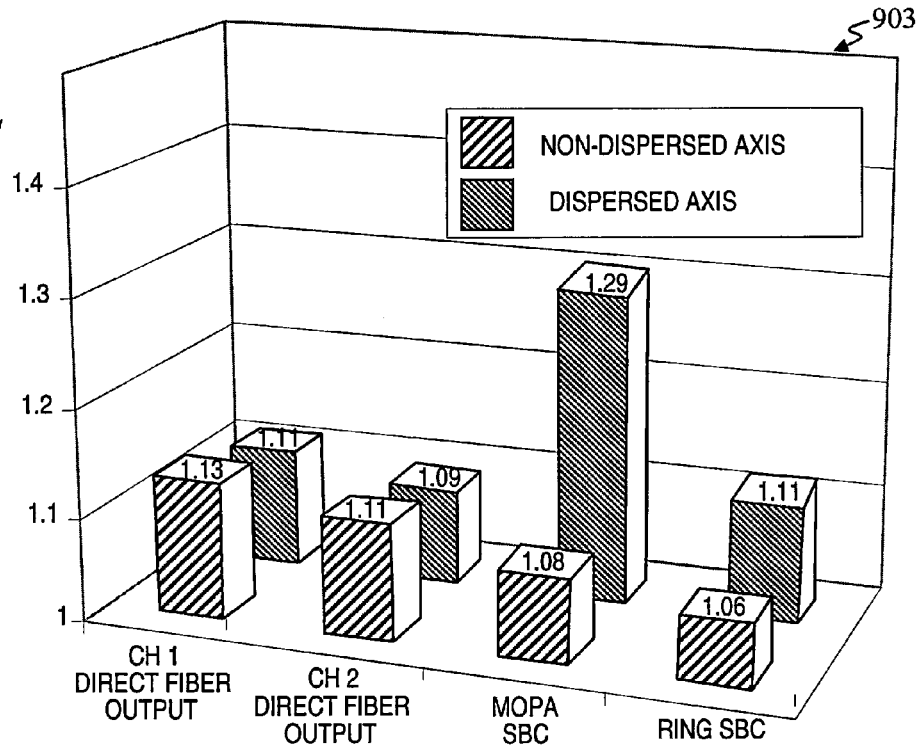
FIG. 9C is a graph 903 of $M^2$ in the output of an SBC ring laser as compared to a single-grating linear MOPA SBC system.

FIG. 9C is a graph 903 of $M^2$ in the output of an SBC ring laser as compared to a single-grating linear MOPA SBC system.

Figure 9D:
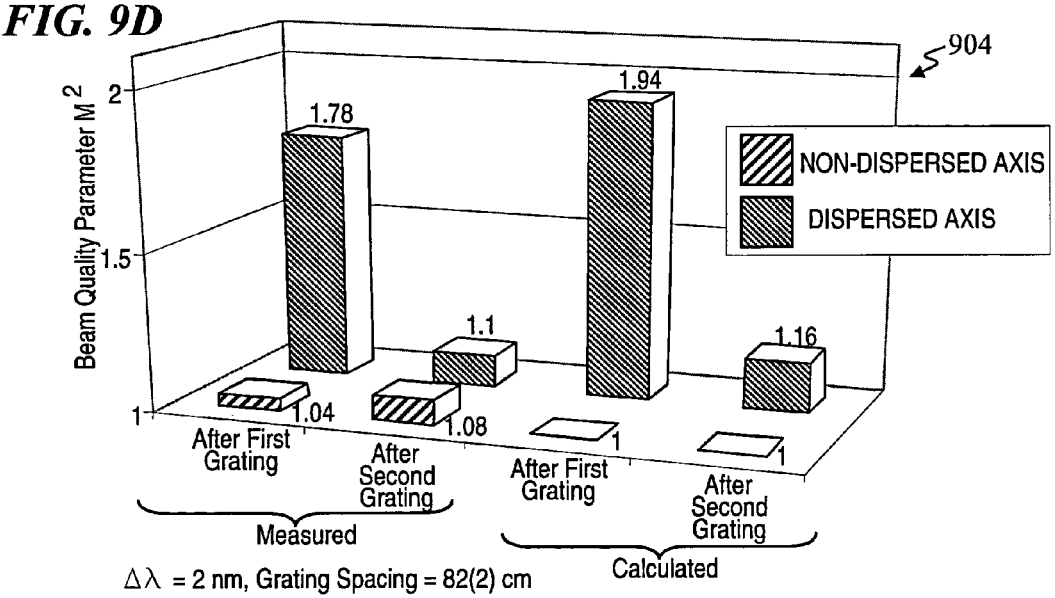
FIG. 9D is a graph 904 that shows beam quality $M^2$ (both measured and calculated) for the dual-grating linear SBC system at wavelength interval $(\lambda_n - \lambda_{n-1}) = 2$ nm and spatial-fill factors of $(2\omega_0/x) = 0.45$.

FIG. 9D is a graph 904 that shows beam quality $M^2$ (both measured and calculated) for the dual-grating linear SBC system at wavelength interval $(\lambda_n - \lambda_{n+1}) = 2$ nm and spatial-fill factors of $(2\omega_0/x) = 0.45$.

Figure 9E:
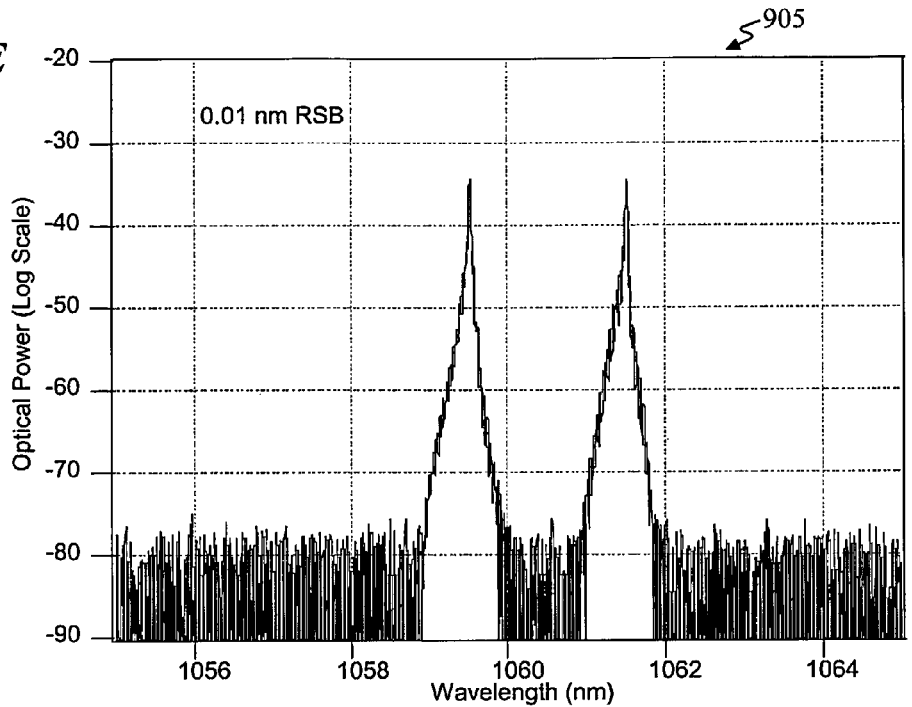
FIG. 9E is a graph 905 that shows the corresponding combined-beam optical spectra.

FIG. 9E is a graph 905 that shows the corresponding combined-beam optical spectra.

Dual Grating SBC

The principle of dual-grating SBC system was demonstrated using two low-power fiber-laser channels with 7.3 W at 1060 nm and 6.4 W at 1062 nm. A schematic of the experimental setup is shown in FIG. 10.

Figure 10:
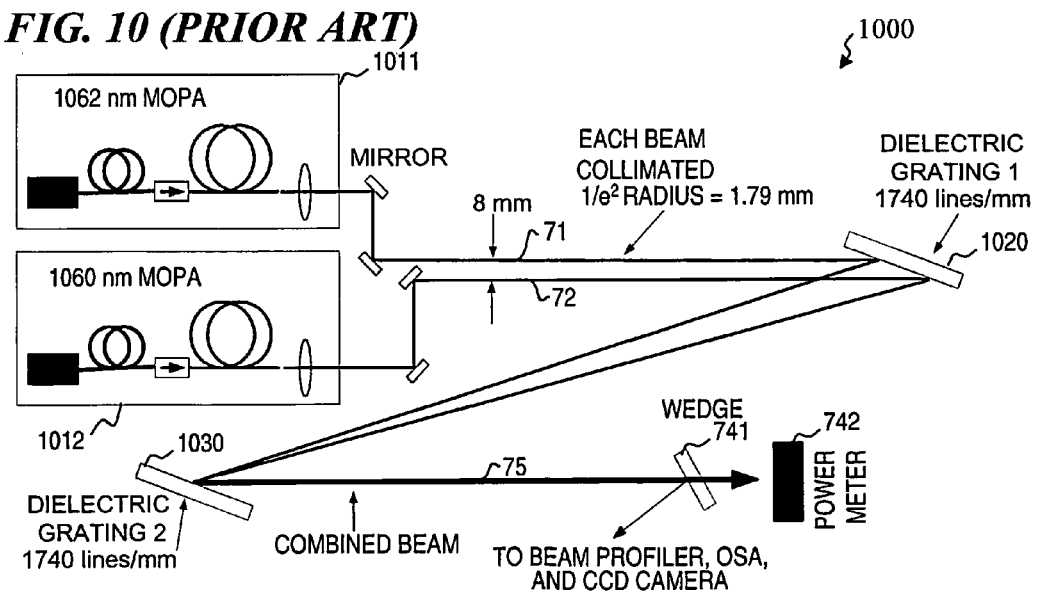
FIG. 10 is a block diagram of a prior-art chromatic-dispersion-compensated MOPA-based spectral-beam-combining laser system 1000.

FIG. 10 is a block diagram of a prior-art chromatic-dispersion-compensated MOPA-based spectral-beam-combining laser system 1000. In some embodiments, system 1000 includes a plurality of linear MOPA lasers 1011-1012 that provide collimated parallel intermediate output beams 71-72 to impinge on compensating grating 1020, which introduces a compensating dispersion as well as causing the beams to angularly converge onto output grating 1030, which spectrally combines the beams into output beam 75, some of which is reflected by wedge 741 to a beam profiler, an optical spectrum analyzer (OSA) and a charge-coupled-device imager (CCD camera), and the rest of which is measured by power meter 742. In some embodiments, the combined output power is 10.9 W giving a SBC combining efficiency of 80%. One advantage of the dual-grating SBC system is that the linewidth requirement of the fiber-laser channels is significantly reduced and near-diffraction-limited combined beam can be obtained even at linewidths up to 0.2 nm. In this experiment, the measured $1/e^2$ full spectral widths are 0.153 nm and 0.137 nm for the two channels. The combined beam is near diffraction limited ($M^2$~1.1) as shown in FIG. 9D and for comparison the single-grating beam quality (such as obtained from MOPA SBC system 701 of FIG. 7A) for the same linewidths is poor ($M^2$~1.9). The dual-grating SBC system was also demonstrated for channel separation of 4 nm with similarly good beam quality and as expected the grating separation is only half as before. The grating separation increases when the channel separation is reduced to increase the number of channels or when the beam size is made larger to reduce the intensity on the grating. This marks the main trade-off in the design of the dual-grating SBC system.

FIG. 9D's graph 904 shows beam quality $M^2$ (both measured and calculated) for the dual-grating SBC system 1000 of FIG. 10 at wavelength interval $(\lambda_n-\lambda_{n-1})=2$ nm and spatial-fill factors of $(2\omega_0/x)=0.45$. A graph 905 of the corresponding combined beam optical spectra is shown in FIG. 9E. Measurements were performed at combined beam powers of >9 W. Beam qualities following the first grating are average values for the two channels.

Spectrally beam-combined fiber-laser technology has been shown to be a good approach to scale the output power of fiber-laser systems to multi-kW output without sacrificing the beam quality or high efficiency of the Yb-doped fiber lasers. In this discussion above, we analytically compared three different spectral-beam-combination approaches by mainly comparing the beam quality as a function of different system parameters. The advantages and trade-offs for each approach were also discussed and the suitability of each approach will depend on the system requirements. We have also shown experimental results obtained at Lockheed Martin Aculight Corporation that confirm the theoretical predictions. Based on the current system performance, SBC fiber-laser approach, in some embodiments, obtains over 100 kW from a fiber-laser system.

Figure 11:
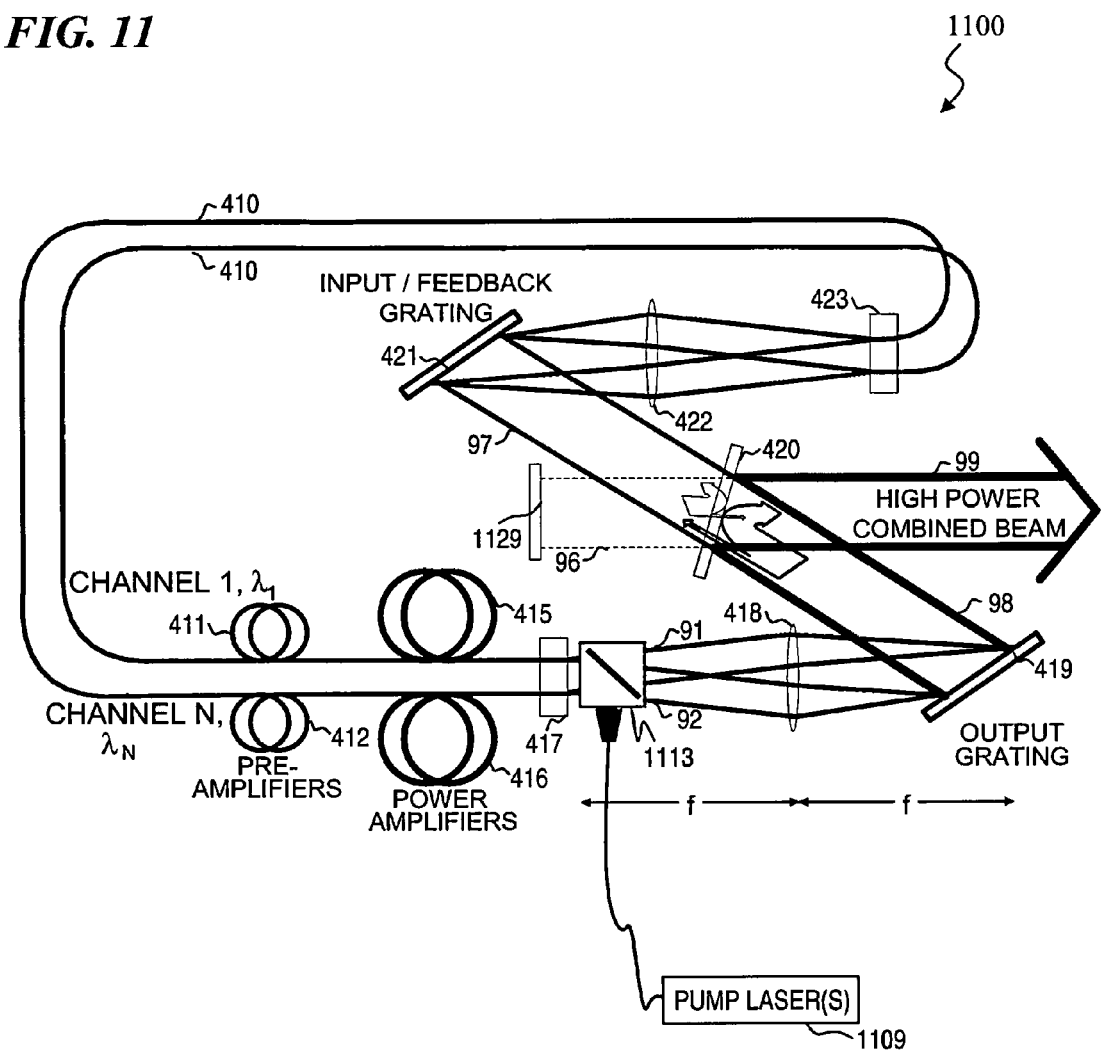
FIG. 11 is a block diagram of a spectral-beam-combining ring laser system 1100 that uses a reflector outside of the high-power paths to ensure unidirectional travel of the lasing beams around the rings.

FIG. 11 is a block diagram of a spectral-beam-combining ring laser system 1100 that uses a reflector outside of the high-power paths to ensure unidirectional travel of the lasing beams around the rings. In some embodiments, system 1100 is similar to system 400 of FIG. 4 but uses fewer or no in-line isolators and instead uses a beam-reversing mirror 1129 (a high-reflectivity mirror to reverse any backward-traveling light so ring laser has (e.g., counter-clockwise (ccw) in FIG. 11) unidirectional signal propagation. In some embodiments, system 1100 includes a plurality of optical fibers 410 (the two shown, plus optionally one or more others located at spaced-apart positions between those shown) coupled to fiber input v-groove block 423 to receive chromatically dispersed optical feedback from grating 421 and focusing element 422 (e.g., a lens or mirror). The optical signals in fibers 410 are each amplified by their respective preamplifier 411-412, and respective power amplifier 415-416. The output end of each fiber is held by fiber output v-groove block 417. In some embodiments, each fiber's output end has a beam-expanding endcap and/or a hollow-core fiber termination, such as are described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. In some embodiments, a pump block 1113 (similar to those described in FIG. 1G of U.S. Pat. No. 7,391,561) is used to launch pump light from pump laser(s) 1109 in a direction that counter-propagates relative to the ring-laser signals. The plurality of output beams 91-92 are each collimated by focusing element 418 (e.g., a lens as shown, or a diffractive focussing optical element or mirror that perform the corresponding function) into their own respective angularly converging collimated beam that each impinge onto grating 419 at a different angle, and due to their respective different wavelengths, each is spectrally combined into a single beam 98. In some embodiments, a mostly reflective, but partially transmissive, output mirror 420 (also called a beam sampler 420) reflects most of beam 98 into output beam 99, which, due to the single output grating 419, has chromatic dispersion. In some embodiments, output mirror 420 reflects about 99% of beam 98 into output beam 99, and transmits about 1% as feedback beam 97, which is then diffracted by input grating 421 and focused by focusing element 422 (e.g., a lens as shown, or a diffractive focussing optical element or mirror that perform the corresponding function) such that each different wavelength is directed into its own respective optical fiber 410 held by fiber input v-groove block 423. Due to the high reflectivity of output mirror 420, most of any backward-traveling signal is reflected to beam 96, which is then reflected by mirror 1129 back to output mirror 420, which then reflects most of that into the forward-traveling beam 97. This reflection of most of the backward-traveling signal into the forward direction creates a large loss for the backward-traveling signal and forces the ring laser into a unidirectional mode. In some embodiments, the fibers 410 and amplifiers 411, 412, 415, and 416 are polarization maintaining and provide a linearly polarized output beam. In some embodiments, the linear polarization of the optical signals also provides an improved efficiency when being diffracted by the gratings 419 and 421.

Figure 12:
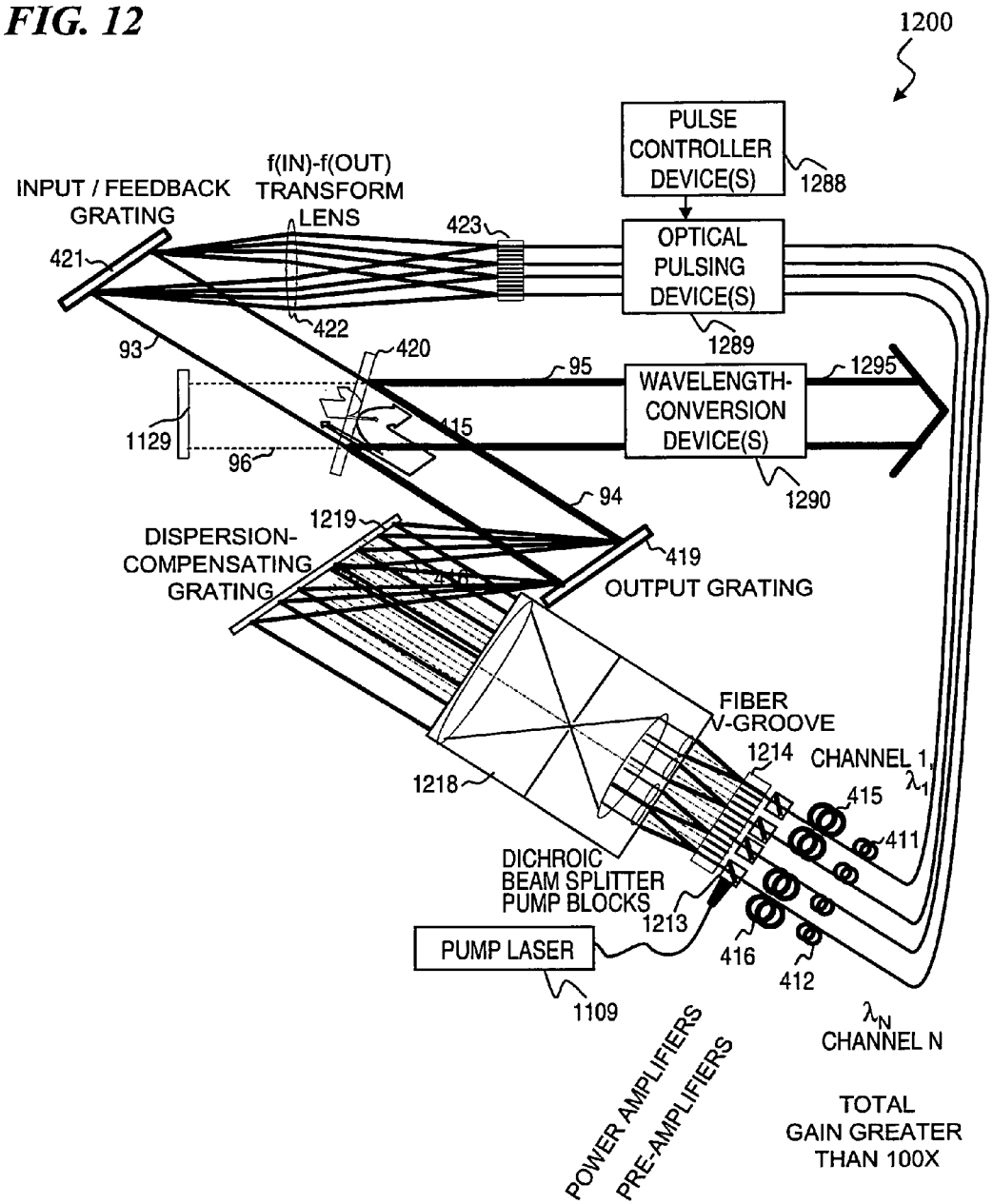
FIG. 12 is a block diagram of a chromatic-dispersion-compensated spectral-beam-combining ring laser system 1200 that uses a reflector outside of the high-power paths to ensure unidirectional travel of the lasing beams around the rings, but which uses a lens system to collimate the output beams from a plurality of fiber ends.

FIG. 12 is a block diagram of a chromatic-dispersion-compensated spectral-beam-combining ring laser system 1200 that uses a reflector outside of the high-power paths to ensure unidirectional travel of the lasing beams around the rings, and which uses a lens system 1218 (e.g., a collimating and telecentric lens system) to collimate the output beams from a plurality of fiber ends onto a chromatic-dispersion-compensating high-efficiency dielectric grating 1219. In some embodiments, a plurality of pump blocks 1213 are used to launch pump light in a counter-propagating direction to the ring-laser signals, wherein the high-power pulsed signal light is reflected by the internal dichroic mirrors and the low-power pump light is transmitted (such as those described in FIG. 1G of U.S. Pat. No. 7,391,561), and, in some embodiments, the output delivery fiber of the pump blocks 1213 that is coupled to fiber V-groove block 1214 is a hollow-core photonic-crystal fiber with a sealed angled or lensed endcap (such as those described in FIGS. 12A, 12B, 12C, and/or 12D of U.S. Pat. No. 7,391,561). In some embodiments, chromatic-dispersion-compensating high-efficiency dielectric grating 1219 is segmented, such as described in FIG. 5, above, or as described in U.S. patent application Ser. No. 12/165,651 filed Jun. 30, 2008 and titled METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS (which issued as U.S. Pat. No. 8,179,594 on May 15, 2012), which is incorporated herein by reference.

In some embodiments, a pulse controller 1288 provides one or more electronic control signals to an optical modulator 1289. In some embodiments, each of the ring-laser gain paths if pulsed and/or the output is directed through wavelength-conversion devices, such as described in U.S. patent application Ser. No. 12/053,551 filed Mar. 21, 2008 and titled HIGH-POWER, PULSED RING FIBER OSCILLATOR (which issued as U.S. Pat. No. 7,876,803 on Jan. 25, 2011), U.S. patent application Ser. No. 11/484,358 filed Jul. 10, 2006 and titled APPARATUS AND METHOD FOR PUMPING AND OPERATING OPTICAL PARAMETRIC OSCILLATORS USING DFB FIBER LASERS (which issued as U.S. Pat. No. 7,620,077 on Nov. 17, 2009), U.S. Pat. No. 7,471,705 filed Nov. 9, 2006 and titled ULTRAVIOLET LASER SYSTEM AND METHOD HAVING WAVELENGTH IN THE 200-NM RANGE, which are each incorporated herein by reference. In some embodiments, the power amplifiers 415-416 and/or the pre-amplifiers 411-412 include bend-loss mitigation technology and/or multiple-core technology such as described in U.S. patent application Ser. No. 12/169,628 filed Jul. 8, 2008 and titled MICRO-STRUCTURED FIBER PROFILES FOR MITIGATION OF BEND-LOSS AND/OR MODE DISTORTION IN LMA FIBER AMPLIFIERS, INCLUDING DUAL CORE EMBODIMENTS (which issued as U.S. Pat. No. 7,924,500 on Apr. 12, 2011), which is incorporated herein by reference. Thus, in some embodiments, system 1200 provides a high-quality chromatic-dispersion-compensated very-high-power output beam, usable in a variety of pulsed or cw (continuous-wave) applications.

FIG. 13 is a block diagram of a chromatic-dispersion-compensated spectral-beam-combining ring laser system 1300 that uses a reflector outside of the high-power paths to ensure unidirectional travel of the lasing beams around the rings and high-efficiency dielectric-coated reflective optics in the high-power paths, and optionally includes pulse components. In some embodiments, system 1300 is similar to system 1200 of FIG. 12, except that lens system 1218 is replaced by mirror system 1318, which, in some embodiments, includes a pair of mirrors 1341 and 1342 such as described in U.S. Pat. No. 6,324,016 issued to Luster on Nov. 27, 2001 titled TELECENTRIC LENS, which is incorporated herein by reference. In some embodiments, mirror 1341 is modified or supplemented by another collimating mirror system that collimates the beams emitted from the fiber ends at block 1214. In some embodiments, the mirrors 1341, and 1342 are multi-layer dielectric coated to be highly reflective at the signal wavelengths. Other aspects of system 1300 are as described above for like-numbered elements.

In some embodiments, one or more of the gratings described for any of the Figures herein (including the gratings 1219, 419 and 421 of FIG. 13) include multi-layer dielectric-coated reflection-mode gratings (such as described in U.S. Pat. No. 5,907,436 titled "MULTILAYER DIELECTRIC DIFFRACTION GRATINGS", which issued May 25, 1999 to Perry et al., and is incorporated herein by reference) to be highly efficient at the signal wavelengths.

In some embodiments, one or more of the gratings described for any of the Figures herein include volume Bragg gratings (such as described in U.S. Pat. No. 7,424,185 titled "STRETCHING AND COMPRESSION OF LASER PULSES BY MEANS OF HIGH EFFICIENCY VOLUME DIFFRACTIVE GRATINGS WITH VARIABLE PERIODS IN PHOTO-THERMO-REFRACTIVE GLASS" issued Sep. 9, 2008 to Glebov et al., which is incorporated herein by reference. In some embodiments, the volume Bragg gratings are reflective gratings, while in other embodiments, transmissive volume Bragg gratings are used. In some embodiments, such volume Bragg gratings are available from the OptiGrate company, 3267 Progress Drive, Orlando, Fla. 32826, USA.

In some embodiments, one or more of the gratings described for any of the Figures herein include transmissive gratings rather than reflective gratings, and rearrange the other optical elements to accommodate the change.

FIG. 14A is a block diagram of a chromatic-dispersion-compensated spectral-beam-combining ring laser system 1401 that uses a reflector outside of the high-power paths to ensure unidirectional travel of the lasing beams around the rings and high-efficiency dielectric-coated reflective optics in all paths. In some embodiments, system 1400 is similar to system 1100 of FIG. 11 but uses mirrors, dichroic beam splitters and focussing elements that are highly reflective or very highly reflective at signal wavelengths, thus avoiding lenses and other optical elements that the signal beam might otherwise be forced to propagate through. In some embodiments, system 1401 includes a plurality of optical fibers 1410 (the three shown, plus optionally one or more others located at spaced-apart positions between those shown) coupled to fiber input v-groove block (not shown, but similar to that shown and described above (reference number 423 of FIG. 12) to receive chromatically dispersed optical feedback from gratings 1424 and 1425 and focusing elements 1478 and 1479 (e.g., a multi-layer dielectric mirror system). The optical signals in fibers 1410 are each amplified by their respective preamplifier 1411 and respective power amplifier 1415. The output ends of each power-amplifier fiber is connected to a pump-block v-groove block 1414 (such as pump blocks 1213 (similar to those described in FIG. 1G of U.S. Pat. No. 7,391, 561) and v-groove block 1214 of FIG. 12). In some embodiments, each fiber's output end has a beam-expanding endcap and/or a hollow-core fiber termination, such as are described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. The plurality of output beams 91-92 are each collimated by focusing elements 1476 and 1477 (e.g., a pair of a multi-layered dielectric coated paraboloid mirrors that magnify collimated beams coming from block 1414 (which, in some embodiments, itself uses multi-layered dielectric coated focussing mirrors to collimate the signal beams), such as described in U.S. Pat. No. 6,324,016 by Luster) onto compensating grating 1421 (which, in some embodiments, is a multi-layer high-efficiency dielectric grating, and is segmented, such as described in FIG. 5, above, or as described in U.S. patent application Ser. No. 12/165,651 filed Jun. 30, 2008 and titled METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS (which issued as U.S. Pat. No. 8,179,594 on May 15, 2012), which is incorporated herein by reference). Grating 1421 diffracts each of the input beams into their own respective angularly converging collimated beam that each impinge onto a single area of output grating 1422 at a different angle, and due to their respective different wavelengths, each is diffracted and thus spectrally combined into a single beam 94. In some embodiments, a mostly reflective, but partially transmissive, output mirror 1420, which reflects most of chromatic-dispersion-compensated beam 94 into output beam 95, which, due to the compensating grating 1421 an output grating 1422, has little or no chromatic dispersion. In some embodiments, output mirror 1420 reflects about 99% of beam 94 into output beam 95, and transmits about 1% as feedback beam 93, which is then diffracted by chromatic-dispersion-compensating grating 1424 and input grating 1425 and focused by focusing elements 1478 and 1479 (e.g., a pair of a multi-layered dielectric coated paraboloid mirrors that de-magnify the collimated beams coming from grating 1425) such that each different wavelength is directed into its own respective optical fiber held by a fiber input v-groove block such as those described above. Due to the high reflectivity of output mirror 1420, most of any backward-traveling signal is reflected to beam 96, which is then reflected by mirror 1429 back to output mirror 1420, which then reflects most of that into the forward-traveling beam 93. This reflection of most of the backward-traveling signal into the forward direction creates a large loss for the backward-traveling signal and forces the ring laser into a unidirectional mode. In some embodiments, the fibers 1410 and amplifiers 1411 and 1415 are polarization maintaining and provide a linearly polarized output beam. In some embodiments, the linear polarization of the optical signals also provides an improved efficiency when being diffracted by the gratings 1421 and 1422, 1423 and 1425. In some embodiments, output beam combiner and feedback separator optical system 1450 provides the free-space optical paths for all signals outside of those in the ring-laser gain elements. Other aspects of system 1401 are as described above for like-numbered elements.

Figure 14B:
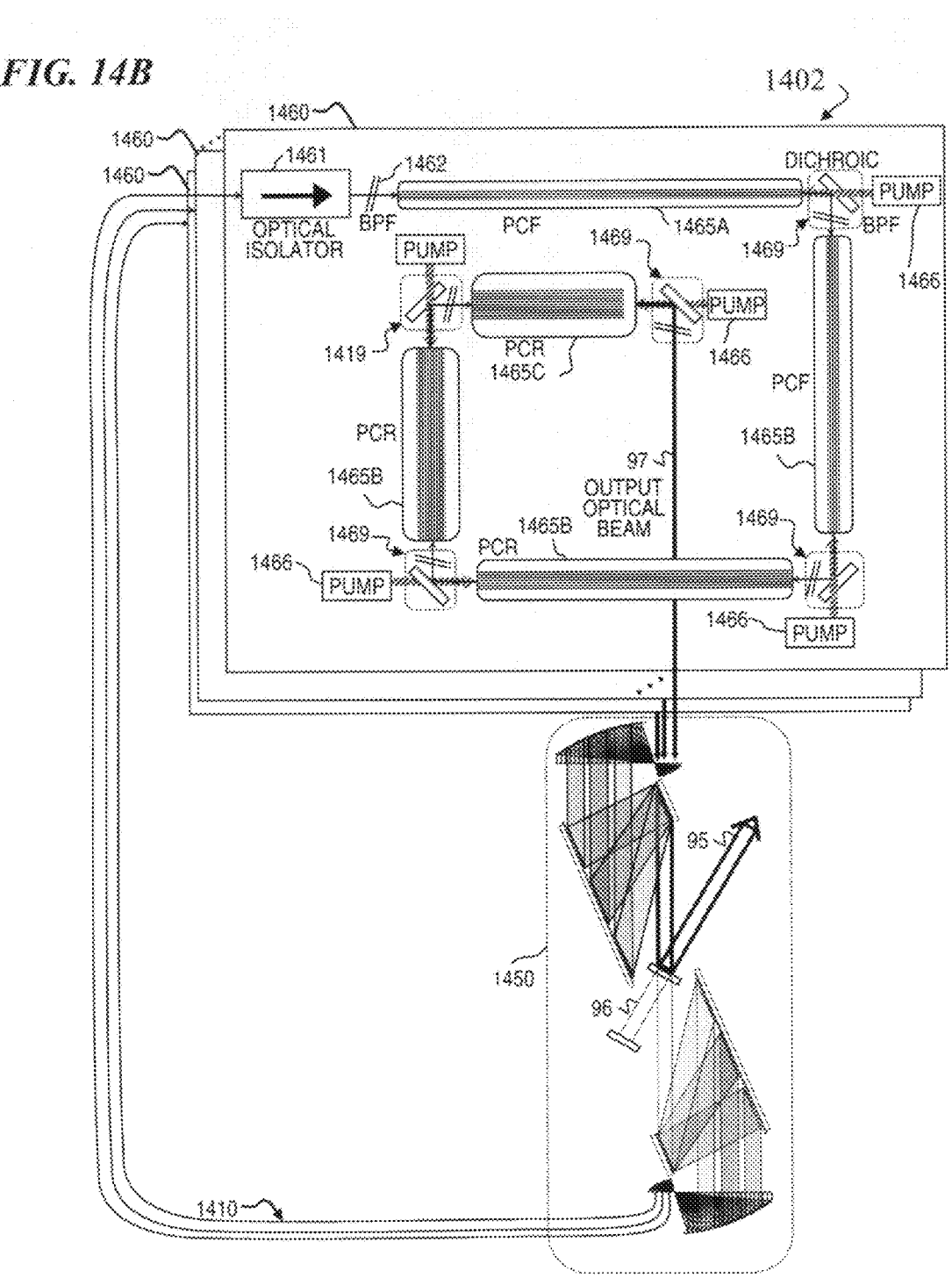
FIG. 14B is a block diagram of a chromatic-dispersion-compensated spectral-beam-combining ring laser system 1402 that uses a reflector outside of the high-power paths to ensure unidirectional travel of the lasing beams around the rings and high-efficiency dielectric-coated reflective optics in all paths, and includes segmented and filtered very-high-power photonic-crystal fibers, rods, and/or ribbons as gain elements.

FIG. 14B is a block diagram of a chromatic-dispersion-compensated spectral-beam-combining ring laser system 1402 that uses a reflector outside of the high-power paths to ensure unidirectional travel of the lasing beams around the rings and high-efficiency dielectric-coated reflective optics in all paths, and includes segmented and filtered very-high-power photonic-crystal fibers, rods, and/or ribbons as gain elements in each one of a plurality of power-amplifier gain-element subsystems 1460 (such as described in more detail in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. In some embodiments, each fiber of a plurality of optical fibers 1410 delivers ring-laser feedback light into one of the plurality of power amplifiers 1460. In some embodiments, each one of the power amplifiers 1460 includes an optical isolator 1461 in the lowest-power input leg, and optionally includes a band-pass filter 1462 tuned for its particular wavelength (which wavelength is different for each of the plurality of power amplifiers 1460), and delivers signal into the end of a photonic-crystal fiber (PCF) or rod (PCR) 1465A, the other end of which is optically coupled to a pump block 1469, which reflects the signal wavelength into one or more of the next further-amplifying stages 1465B or 1465C, and transmits pump light from pump laser 1466 in a counter-propagating direction into the previous PCF 1465A. In some embodiments, each of one or more further-amplifying stages 1465B are each connected to a pump block 1469, and transmits pump light from pump laser 1466 in a counter-propagating direction into the previous PCF 1465B and reflects signal light into the following stage or the intermediate output beam of power amplifier 1460, which is then combined by optical subsystem 1450 into a single output beam 95 having chromatic-dispersion compensation. Other aspects of system 1402 are as described above for FIG. 14A for like-numbered elements.

FIG. 14C is a plan-view block diagram of a chromatic-dispersion-compensated spectral-beam-combining focussing- and diffractive-element system 1451 used in some embodiments of the ring-laser systems described herein, such as for the upper half of subsystem 1450 of FIG. 14B. In some embodiments, system 1451 receives ring-laser signal light from power amplifiers 1468 (in some embodiments, an optical ribbon or slab having a plurality of photonic-crystal defined doped cores, such as described in U.S. Pat. No. 7,391,561. In some embodiments, system 1451 includes paraboloid reflectors 1477 and 1476 that receive the intermediate output beams from power amplifiers 1468 in a collimated parallel form and telecentrically magnify the cross-sectional image resulting in enlarged parallel collimated beams 1428. These enlarged parallel collimated beams 1428 are spectrally combined using chromatic-dispersion compensation by gratings 1421 and 1422 into a single output beam 1429, which has the characteristic widening due to the dispersion spreading that occurs between gratings 1421 and 1422. For embodiments in which system 1451 is used to separate the plurality of channels in a ring-laser SBC system, the combined input beam is passed through system 1451 in the opposite direction (bottom-to-top overall in FIG. 14C), thus starting with a single enlarged beam propagating upward at the position of reference number 1429, and ending with de-magnified and spectrally separated beams 1427, which are then focussed and launched into the waveguides or cores of element 1468. Other aspects of system 1451 are as described above for FIG. 14A for like-numbered elements.

FIG. 14D is an elevation-view block diagram of chromatic-dispersion-compensated spectral-beam-combining focussing- and diffractive-element system 1451 shown in FIG. 14C.

FIG. 15A is a plan-view block diagram of a chromatic-dispersion-compensated spectral-beam-combining focussing- and diffractive-element system 1551 used in some embodiments of the ring-laser systems described herein. In some embodiments, system 1551 is used one or more times in subsystem 1450 of FIG. 14A or FIG. 14B, e.g., in place of system 1451 described in FIG. 14C and FIG. 14D. In some embodiments, a two-dimensional grid of parallel collimated input beams 1527 from a two-dimensional array of, for example, amplifying fibers or hollow-core delivery fibers that are held in a stack of v-groove blocks 1578 (plan view of the top block shown in FIG. 15A and elevation view of the plurality of blocks shown in FIG. 15B), or multiple-core photonic-crystal gain elements in a stack of ribbon-shaped waveguide supports (such as are described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD). In some embodiments, a pair of paraboloid multi-layer-dielectric-coated reflectors 1576 and 1577 are used to magnify (in the case of the output end of the ring lasers' gain elements) or de-magnify (in the case of the input end of the ring-lasers' gain elements), converting between small closely-packed two-dimensional (2D) array of beams 1527 and enlarged 2D array of beams 1528. In some embodiments, 2D segmented grating system (1521, 1522) directs each column of beams of array 1528 to a unique position in the single column of beams 1595, which impinge on compensating grating 1523 and then the still-collimated beams angularly converge to output grating 1524, and exit as a single beam 1529. When used as a chromatic separator, system 1551 starts with multi-wavelength feedback beam as 1529, which impinges on grating 1524, which diffracts/disperses each different wavelength to its respective position on grating 1523, which then re-diffracts the different wavelengths as a column of parallel collimated beams 1595. In some embodiments, when the gratings 1523 and 1524 do not provide the desired amount of spread between the different beams of 1528, the additional segmented gratings 1521 and 1522 provide the extra separation. In other embodiments, when gratings 1523 and 1524 do provide the desired amount of spread between the different beams of 1528, segmented gratings 1521 and 1522 are replaced by segmented mirrors to convert between linear row of beams 1595 and the 2D array of beams 1528.

FIG. 15B is an elevation-view block diagram of 2D chromatic-dispersion-compensated spectral-beam-combining focussing- and diffractive-element system 1551.

Figure 16:
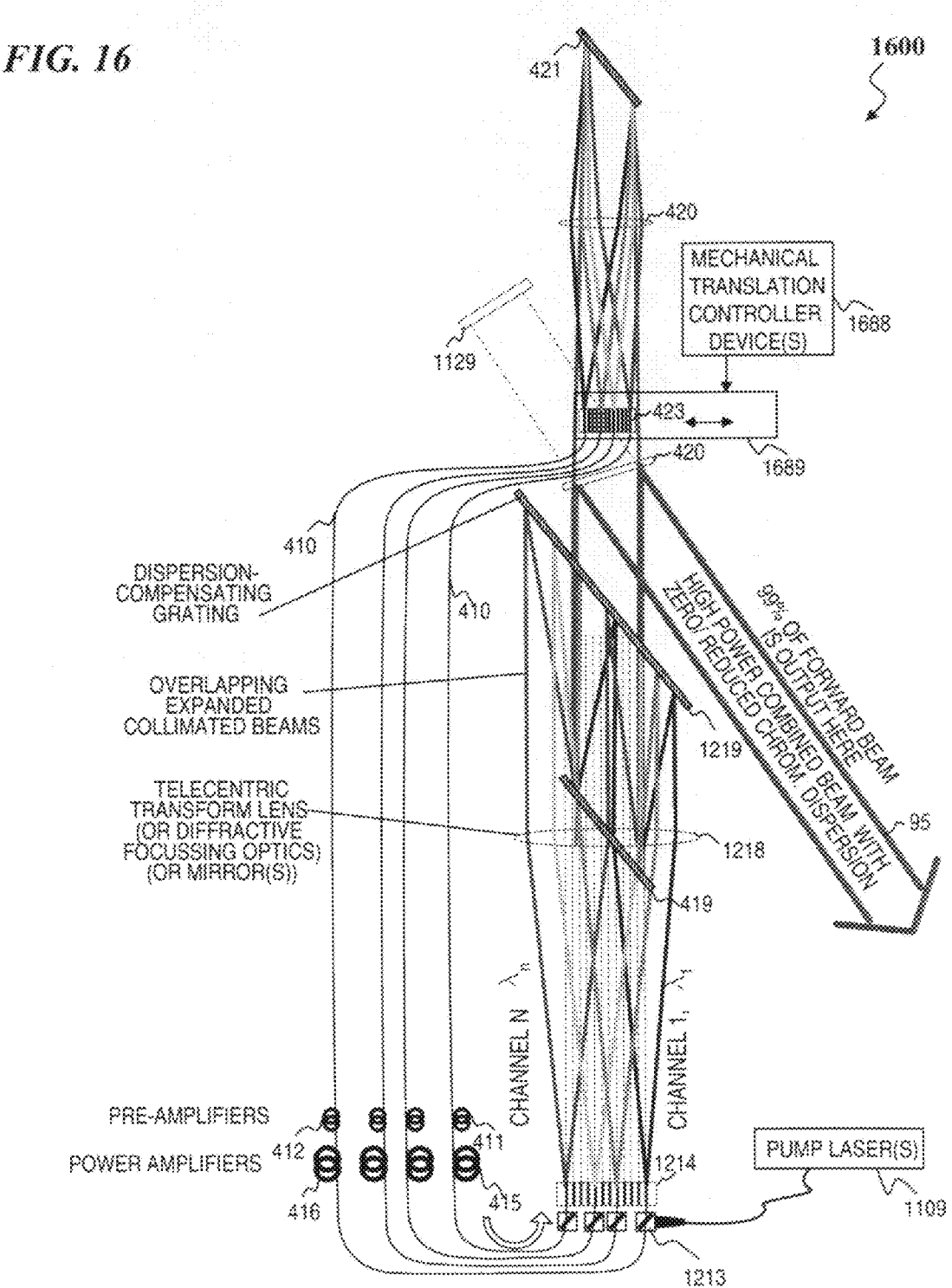
FIG. 16 is a plan-view block diagram of a chromatic-dispersion-compensated spectral-beam-combining ring laser system 1600 that uses a reflector outside of the high-power paths to ensure unidirectional travel of the lasing beams around the rings and high-efficiency dielectric-coated reflective optics in all paths, and uses near-Littrow-angle configurations.

FIG. 16 is a plan-view block diagram of a chromatic-dispersion-compensated spectral-beam-combining ring laser system 1600 that uses a reflector outside of the high-power paths to ensure unidirectional travel of the lasing beams around the rings and high-efficiency dielectric-coated reflective optics in all paths, and uses near-Littrow-angle configurations. In some embodiments, system 1600 of FIG. 16 is identical to system 1200 of FIG. 12, except that each of the diffraction gratings is configured to operate at or near the Littrow angle for the wavelengths used. In some embodiments, the single-pass total gain of each ring is greater than one-hundred times, such that when output mirror 420 outputs 99% of the beam, the remaining 1% provides sufficient feedback to maintain lasing.

In some embodiments, the input block 423 (of any of the above Figures, but in a manner illustrated in FIG. 16) includes a mechanical translation stage 1688 and a controller 1689 used to control movement of the mechanical translation stage 1688 and thus control the different wavelengths of the feedback signals launched into fibers 410 of the ring lasers. In some embodiments, such mechanical translation of the input block 423 in the dispersive plane is used to tune the various wavelengths of the ring lasers. In some embodiments, such as system 1200 of FIG. 12, of system 1600 of FIG. 16, the mechanical translation of the input block 423 (by a mechanical translation stage 1688 and a controller 1689) is used to beam-steer the output beam 95 over a plurality of lateral positions, since the different wavelengths are diffracted by grating 1219 to different output angles and thus different lateral positions on output grating 419, and thus steer the output beam to different lateral positions parallel to each other. In other embodiments, such as system 1100 of FIG. 11, the mechanical translation of the input block 423 (by a mechanical translation stage 1688 and a controller 1689) is used to beam-steer the output beam 95 over a plurality of different output angles, since the different wavelengths are diffracted to different output angles by output grating 419.

In some embodiments, the present invention provides an apparatus that includes a ring-laser system having a plurality of ring-laser gain elements and a spectral-beam-combining output stage configured to combine a plurality of beams coming from the gain elements into an output beam and that includes chromatic-dispersion compensation. Some embodiments further include a power supply, pump lasers, beam steering devices and the like, as well as entire systems that use the output beam. In some embodiments, such entire systems include military vehicles, aircraft or watercraft, or laser medical systems, or laser printers, or other devices that can use the output beam described herein.

In some embodiments, the output stage includes a plurality of highly reflective dielectric-coated focussing elements.

In some embodiments, the output stage includes a plurality of high-efficiency dielectric-coated grating elements.

In some embodiments, the output stage includes a mostly reflective but partially transmissive output mirror and a highly reflective beam-reversing mirror configured to reflect a majority of a backward-traveling signal beam such that it becomes forward traveling.

In some embodiments, at least one of the gain elements further includes a photonic-crystal-rod power amplifier.

Some embodiments further include an amplitude modulator configured to pulse the plurality of beams, and a timing controller configured to synchronize the pulses of the plurality of beams.

Some embodiments further include a non-linear wavelength-conversion device.

In some embodiments, the gain elements obtain feedback signal from a spectrally separated portion of the output beam.

In some embodiments, the output stage includes a segmented grating configured to combine intermediate output beams of gain elements, wherein the intermediate output beams are arranged in a two-dimensional array.

In some embodiments, each one of the one or more optical fibers further includes a bend-compensating index gradient.

In some embodiments, the present invention provides method that includes chromatic-dispersion compensating each of a plurality of laser beams coming from a plurality of gain elements, spectral-beam combining the plurality of chromatic-dispersion compensated beams into a combined intermediate output beam, outputting a majority of the combined intermediate output beam as an output beam, separating a remaining portion of the combined intermediate output beam into different wavelengths, and using the different wavelengths as feedback in a ring configuration to the plurality of gain elements.

Some embodiments of the method further include reflecting the plurality of laser beams using a plurality of highly reflective dielectric-coated focussing elements.

Some embodiments of the method further include diffracting the plurality of laser beams using a plurality of high-efficiency dielectric-coated grating elements.

Some embodiments of the method further include reflecting the majority of the combined intermediate output beam from a mostly reflective but partially transmissive output mirror, and reflecting a majority of a backward-traveling signal beam such that it becomes forward traveling.

Some embodiments of the method further include using a photonic-crystal-rod power amplifier in at least one of the gain elements.

Some embodiments of the method further include amplitude modulating the plurality of beams to pulse them, and synchronizing the pulses of the plurality of beams.

Some embodiments of the method further include non-linear wavelength-converting the output beam to a wavelength other than that of the output beam.

Some embodiments of the method further include segmenting intermediate output beams of gain elements in a two-dimensional array of laser beams of a plurality of different wavelengths.

Some embodiments of the method further include providing a bend-compensating index gradient in each one of the plurality of optical gain elements.

In some embodiments, the present invention provides an apparatus that includes means for chromatic-dispersion compensating each of a plurality of laser beams coming from a plurality of gain elements, means for spectral-beam combining the plurality of chromatic-dispersion compensated beams into a combined intermediate output beam, means for outputting a majority of the combined intermediate output beam as an output beam, means for separating a remaining portion of the combined intermediate output beam into different wavelengths, and means for using the different wavelengths as feedback in a ring configuration to the plurality of gain elements.

In some embodiments, one or more of the elements described for one of the embodiments or Figures herein is substituted into or added to one of the other embodiments or Figures for form other embodiments of the invention.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a ring-laser system that includes a plurality of ring-laser gain elements and a spectral-beam-combining output stage configured to combine a plurality of beams coming from the gain elements into an output beam and that includes chromatic-dispersion compensation.

2. The apparatus of claim 1, wherein the output stage includes a plurality of highly reflective dielectric-coated focussing elements.

3. The apparatus of claim 1, wherein the output stage includes a plurality of high-efficiency dielectric-coated grating elements.

4. The apparatus of claim 1, wherein the output stage includes a mostly reflective but partially transmissive output mirror and a highly reflective beam-reversing mirror configured to reflect a majority of a backward-traveling signal beam such that it becomes forward traveling.

5. The apparatus of claim 1, at least one of the gain elements further comprising a photonic-crystal-rod power amplifier.

6. The apparatus of claim 1, further comprising:
   an amplitude modulator configured to pulse the plurality of beams, and
   a timing controller configured to synchronize the pulses of the plurality of beams.

7. The apparatus of claim 6, further comprising a non-linear wavelength-conversion device.

8. The apparatus of claim 1, wherein the gain elements obtain feedback signal from a spectrally separated portion of the output beam.

9. The apparatus of claim 1, wherein the output stage includes a segmented grating configured to combine intermediate output beams of the gain elements, wherein the intermediate output beams are arranged in a two-dimensional array.

10. The apparatus of claim 1, wherein each one of the gain elements further includes a bend-compensating index gradient.

11. A method comprising:
   chromatic-dispersion compensating each of a plurality of laser beams coming from a plurality of gain elements;
   spectral-beam combining the plurality of chromatic-dispersion compensated beams into a combined intermediate output beam;
   outputting a majority of the combined intermediate output beam as an output beam;
   separating a remaining portion of the combined intermediate output beam into different wavelengths; and
   using the different wavelengths as feedback in a ring configuration to the plurality of gain elements.

12. The method of claim 11, further comprising reflecting the plurality of laser beams using a plurality of highly reflective dielectric-coated focussing elements.

13. The method of claim 11, further comprising diffracting the plurality of laser beams using a plurality of high-efficiency dielectric-coated grating elements.

14. The method of claim 11, further comprising reflecting the majority of the combined intermediate output beam from a mostly reflective but partially transmissive output mirror, and reflecting a majority of a backward-traveling signal beam such that it becomes forward traveling.

15. The method of claim 11, further comprising using a photonic-crystal-rod power amplifier in at least one of the gain elements.

16. The method of claim 11, further comprising:
   amplitude modulating the plurality of beams to pulse them, and
   synchronizing the pulses of the plurality of beams.

17. The method of claim 16, further comprising non-linear wavelength-converting the output beam to a wavelength other than that of the output beam.

18. The method of claim 11, further comprising segmenting intermediate output beams of the gain elements in a two-dimensional array of laser beams of a plurality of different wavelengths.

19. The method of claim 11, further comprising providing a bend-compensating index gradient in each one of the plurality of gain elements.

20. An apparatus comprising:
   means for chromatic-dispersion compensating each of a plurality of laser beams coming from a plurality of gain elements;
   means for spectral-beam combining the plurality of chromatic-dispersion compensated beams into a combined intermediate output beam;
   means for outputting a majority of the combined intermediate output beam as an output beam;
   means for separating a remaining portion of the combined intermediate output beam into different wavelengths; and
   means for using the different wavelengths as feedback in a ring configuration to the plurality of gain elements.

* * * * *